United States Patent
Reimnitz

(10) Patent No.: US 10,024,368 B2
(45) Date of Patent: Jul. 17, 2018

(54) MULTI-DISK CLUTCH

(71) Applicant: SCHAEFFLER TECHNOLOGIES AG & CO. KG, Herzogenaurach (DE)

(72) Inventor: Dirk Reimnitz, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/127,941

(22) PCT Filed: Mar. 26, 2015

(86) PCT No.: PCT/DE2015/200199
§ 371 (c)(1),
(2) Date: Sep. 21, 2016

(87) PCT Pub. No.: WO2015/144170
PCT Pub. Date: Oct. 1, 2015

(65) Prior Publication Data
US 2017/0097052 A1  Apr. 6, 2017

(30) Foreign Application Priority Data

Mar. 27, 2014 (DE) .................. 10 2014 205 773
Apr. 4, 2014 (DE) .................. 10 2014 206 549
Jun. 27, 2014 (DE) .................. 10 2014 212 482

(51) Int. Cl.
*F16D 13/75* (2006.01)
*F16D 13/38* (2006.01)
(Continued)

(52) U.S. Cl.
CPC .......... *F16D 13/385* (2013.01); *F16D 13/70* (2013.01); *F16D 21/06* (2013.01); *F16D 69/00* (2013.01);
(Continued)

(58) Field of Classification Search
CPC ................. F16D 2021/0615; F16D 2021/0669
See application file for complete search history.

(56) References Cited

U.S. PATENT DOCUMENTS 3,175,664 A * 3/1965 Ramsel ............... F16D 13/52
192/70.28
4,116,322 A * 9/1978 Ashfield ............... B60K 17/02
192/48.8
4,437,555 A * 3/1984 Tomm ................. F16D 13/757
192/111.16

FOREIGN PATENT DOCUMENTS

DE       10013857 A1   1/2001
DE  10 2011 086929 A1   6/2012
(Continued)

OTHER PUBLICATIONS

International Search Report for PCT/DE2015/200199; 2 pgs; dated Sep. 30, 2015 by European Patent Office.

*Primary Examiner* — Mark A Manley
(74) *Attorney, Agent, or Firm* — Kevin L. Parks

(57) ABSTRACT

A multi-plate clutch for coupling a drive shaft of a motor vehicle engine in a drive train having at least one transmission input shaft. The clutch includes a counter plate for introducing torque from the drive shaft and a clutch plate for conveying the torque to the transmission input shaft and having a first lining ring for torque transmission and a second lining ring that is movable axially relative to the first lining ring for torque transmission. A separator plate is movable axially relative to the counter plate and is positioned between the lining rings. A contact plate is movable axially relative to the counter plate by an actuating element to frictionally compress the clutch plate. The first lining ring is positioned between the contact plate and the separator plate in the axial direction, and the second lining ring is positioned between the separator plate and the counter plate.

23 Claims, 21 Drawing Sheets

(51) Int. Cl.
*F16D 69/00* (2006.01)
*F16D 13/70* (2006.01)
*F16D 21/06* (2006.01)

(52) U.S. Cl.
CPC ........ *F16D 13/75* (2013.01); *F16D 2013/706* (2013.01); *F16D 2021/0615* (2013.01); *F16D 2021/0669* (2013.01)

(56) References Cited

FOREIGN PATENT DOCUMENTS

| DE | 10 2011 018 589 A1 | 10/2012 |
| WO | 2003081065 A1 | 10/2003 |

\* cited by examiner

MULTI-DISK CLUTCH

CROSS-REFERENCE TO RELATED APPLICATIONS

This application is the U.S. national phase patent application under 35 U.S.C. § 371 of International Patent Application Serial No. PCT/DE2015/200199, having an international filing date of 26 Mar. 2015, and designating the United States, which claims priority based upon German Patent Application No. DE 10 2014 205 773.6, filed on 27 Mar. 2014, German Patent Application No. DE 10 2014 206 549.6, filed on 4 Apr. 2014, and German Patent Application No. DE 10 2014 212 482.4, filed on 27 Jun. 2014, the entire contents of each of which applications are hereby incorporated by reference herein to the same extent as if fully rewritten.

BACKGROUND OF THE INVENTION

Field of the Invention

The present invention relates to a multi-plate clutch, in particular a dual-plate clutch, with the help of which a drive shaft of a motor vehicle engine can be coupled to a transmission having at least one transmission input shaft, the multiple-plate clutch being particularly well suited for a dual clutch.

Description of the Related Art

According to the present state of the art, in most cases dry dual clutches have one plate per sub-clutch. The plates can have two friction surfaces, with which they are in contact with their neighboring components (e.g., contact plate and central plate or counter plate) when they are clamped by the clutch to transmit torque, and thus they form two friction locations within the clutch. The torque transmissible by a clutch can be increased even with the same clamping force, same diameter and same friction conditions (coefficient of friction) by increasing the number of friction locations. That principle is frequently employed in lamellar clutches, such are used, for example, in wet-running dual clutches. As dry-running clutches, lamellar clutches are in most cases unsuitable for motor vehicle applications. Without oil, which cools the clutch, the thin plates overheat quickly since they have too little heat capacity. In addition, lamellar clutches do not clear properly in most cases if the friction locations between the plates and the plate carriers are not lubricated by the oil. To be able to utilize the benefits of multiple friction locations per clutch even with dry-running clutches, there are by now inventions that show a way to integrate two or more plates into a sub-clutch, and to realize that result using parts and operating principles that are proven for dry clutches.

From German published patent application DE 10 2011 018 589 A1, a dual-plate clutch is known in which a contact plate and a separator plate are each connected to a counter plate by means of a leaf spring. When the contact plate is moved axially relative to the counter plate from a disengaged position of the dual-plate clutch into an engaged position of the dual-plate clutch, lining rings of a clutch plate provided between the counter plate and the separator plate on one hand and between the separator plate and the contact plate on the other hand are compressed. The separator plate is supported by means of a contact pin in the center of the extension of the leaf spring connected to the contact plate, so that the axial travel of the separator plate is always half as great as the axial travel of the contact plate.

There is a constant need in the drive train of a motor vehicle to be able to transmit an especially high torque with the help of a friction clutch, with various constructions of the drive train.

An object of the present invention is to provide measures that make it possible to transmit an especially high torque with the help of a friction clutch, with various constructions of a drive train.

SUMMARY OF THE INVENTION

The object is fulfilled according to the present invention by a multi-plate clutch that is provided, in particular a dual-plate clutch, for coupling a drive train of a motor vehicle engine having at least one transmission input shaft, in particular for a dual clutch. The dual clutch includes a counter plate for introducing a torque from the drive shaft, and a clutch plate for channeling the torque to the transmission input shaft. The clutch plate has a first lining ring for frictionally engaged torque transmission, and a second lining ring which is movable axially relative to the first lining ring for frictionally engaged torque transmission. A separator plate is movable axially relative to the counter plate, the separator plate being positioned between the first lining ring and the second lining ring in the axial direction, and a contact plate which is movable axially relative to the counter plate by an actuating element to frictionally compress the clutch plate. The first lining ring is positioned between the contact plate and the separator plate in the axial direction, and the second lining ring is positioned between the separator plate and the counter plate.

There are n separator plates and n+1 lining rings provided, the movement of the separator plate in the axial direction being coupled with the movement of the contact plate in the axial direction by means of a coupling mechanism. Over at least part of the distance between an open position of the contact plate, corresponding to the disengaged position of the multi-plate clutch, and a maximum closed position of the contact plate, corresponding to the engaged position of the multi-plate clutch when the lining rings are worn, a current translation distance ratio $i(s_A)$ of the axial displacement of the contact plate to the axial displacement of the separator plate that is furthest distant in the axial direction from the contact plate, at an axial position $s_A$ of the contact plate deviates from $i(s_A)=n+1$, and/or a current distance translation ratio $i(s_A)_j$ of the axial displacement of the contact plate to the axial displacement of a jth separator plate at an axial position $s_A$ of the contact plate, deviates from $i(s_A)_j=(n+1)/j$ where j is counted starting from the counter plate in the direction of the contact plate.

Because of the deviation of the translation distance ratio of the coupling mechanism from n+1, it is possible, for example in the case of a dual-plate clutch where n=1, that the axial travel of the separator plate is not, or is not always, half as great as the travel of the contact plate. As a result, the design demands on the clutch plate and/or on the mode of operation of the multi-plate clutch can be reduced. In particular, it is possible to provide different axial extensions, different axial air masses and/or different axial compressibilities for the different lining rings of the clutch plate, and at the same time to ensure that the frictional grip of the lining rings begins essentially simultaneously. Additionally, or alternatively, an intentionally time-differentiated beginning of the frictional grip of the lining can be provided, so that, for example, with the help of the lining ring having the first frictional engagement, there can already be a first adjustment of rotational speed in a slipping mode until torque can also be transmitted via a lining ring that produces friction subsequently, a smaller rotational speed difference being in effect at the lining ring that comes into frictional contact subsequently.

The engagement of the multi-plate clutch can occur especially gently because of the successively occurring effectiveness of the lining rings, while because of the correspondingly high number of frictional pairings achieved by the lining rings an especially high maximum torque can be transmitted. At the same time, the lining rings can be adapted in particular to their differing utilization, for example by the lining ring which first enters into frictional contact being especially strongly sprung radially and/or having an especially thick friction lining. Because the distance translation ratio of the coupling mechanism deviates from n+1, the multi-plate clutch can easily be adapted to differently dimensioned lining rings, so that transmission of an especially high torque is enabled with the help of a friction clutch with different configurations of a motor vehicle drive train.

For the translation distance ratio of the jth separator plate, counting from the counter plate in a multi-plate clutch having more than one separator plate, a translation distance ratio that differs from $i(s_A)_j=(n+1)/j$ can be applicable. In a dual-plate clutch, the translation distance ratio of the single separator plate (n=1) can differ from 2:1. In a multi-plate clutch having n=2 separator plates, the translation distance ratio of the separator plate (j=1) assigned to the counter plate can differ from 3:1, while the translation distance ratio of the separator plate (j=2) assigned to the contact plate can differ from 3:2.

In a multi-plate clutch having n=3 separator plates, the translation distance ratio of the separator plate (j=1) assigned to the counter plate can differ from 4:1, while the translation distance ratio of the subsequent separator plate in the axial direction (j=2) can differ from 4:2, and the translation distance ratio of the next subsequent separator plate in the axial direction (j=3) can differ from 4:3, and so forth.

A translation distance ratio $i(s_A)$ without the index j relates to the separator plate located axially closest to the counter plate, between which separator plate and the counter plate only one liner ring is provided. The axial position $s_A$ of the contact plate is measured beginning from the open position at which the contact plate is unmoved when the multi-plate clutch is completely disengaged. If no actuating force is exerted on the contact plate by the actuating element, the contact plate can be in the open position, so that the multi-plate clutch is designed as "normally open," or it can be in a closed position so that the multi-plate clutch is designed as "normally closed."

The actuating element can be designed, for example, as an actuating member that is essentially rigid in the axial direction, or as a lever spring that is elastically yieldable in the axial direction. The actuating element designed as a lever spring can in particular be swivel-mounted on a clutch cover that is non-rotatably connected to the counter plate. The actuating element is preferably designed in the nature of a diaphragm spring, and has in particular a diaphragm spring body running in the circumferential direction to provide a diaphragm spring property, while spring tongues can protrude radially inward from the diaphragm spring body which can be acted on in the axial direction in particular by a hydraulic actuating system to introduce the actuating force.

The coupling mechanism by means of which the motion of the separator plate is coupled with the contact plate can be based on a lever principle, in which the motion of the separator plate is tied to the motion of the contact plate through the currently set lever ratio. The separator plate can be firmly connected to the contact plate through the coupling mechanism, so that the pressure plate can be both pushed and pulled by the contact plate. In particular, the contact plate can push the separator plate in the axial direction against the spring force of a spring element when the multi-plate clutch is engaged, whereas when the multi-plate clutch is disengaged the separator plate can follow the motion of the contact plate as a result of the spring force acting on it. Preferably, a first return spring connected to the contact plate, particularly in the form of a leaf spring, is provided to move the contact plate to a defined starting position, especially disengaged. The translation distance ratio $i(s_A)$ set by the coupling mechanism can be constant, independent of the axial position $s_A$ of the contact plate, or, preferably, it can assume different values depending on the current axial position $s_A$ of the contact plate.

The multi-plate clutch is in particular part of a dual clutch, with the two friction clutches of the dual clutch being designed in particular as a dual-plate clutch. The counter plates of the two friction clutches of the dual clutch are preferably formed by a common central plate, so that the axial space requirement of the dual clutch can be reduced, and/or requisite construction space for the multi-plate clutch(es) can be created. Furthermore, a second return spring connected to the separator plate, particularly in the form of a leaf spring, is preferably provided to move the separator plate to a defined starting position, especially disengaged. The first return spring and the second return spring are in particular preferably connected to the counter plate, at least indirectly, by means of a clutch cover that is firmly connected to the counter plate. That solves two problems in particular. First, despite the additional disks and additional plates of the multi-plate clutches, the structure of the dual clutch is not too long axially for the usual dual clutch construction spaces. Second, even without oil lubrication, the plates (contact plates and separator plates) can guarantee clearing of all disks, and thus a disengagement of the clutch that is free of drag torque. To that end, the invention can provide a guidance mechanism based on leaf springs for the separator plates. The operating principle can be based on the operating principle described in German published patent applications DE 100 13 857 A1, DE 10 2011 018 589 A1, and DE 10 2011 086 929 A1, the content of each of which is referenced here and is incorporated as part of the present invention, with various concepts being created by the modification according to the present invention, with which the requirements of dry-running dual clutches can be fulfilled.

The contact plate and/or the separator plate can be non-rotatably connected to the counter plate but axially movably, in particular to transmit torque. To that end, the contact plate and/or the separator plate can preferably be guided axially on a clutch cover that is firmly connected to the counter plate. The respective lining ring can have in particular a fastening strip running in the radial direction, that can be non-rotatably tied to the clutch plate and relatively movable axially if necessary. In particular, at least one friction lining is provided on each of the two sides of the fastening strip. The respective friction lining can be connected to the fastening strip through lining springs that are yieldable in the axial direction, with the fastening strip itself forming the lining spring. To that end, the fastening strip can have a wave-like cross section when viewed in the circumferential direction.

In particular, the value of the current translation distance ratio $i(s_A)$, at least in a segment between the open position of the contact plate and the maximum closed position of the contact plate, in particular at least in a segment between the open position of the contact plate and a closed position of the contact plate that corresponds to the engaged position of the multi-plate clutch with unworn lining rings, is $0.00 < |i(s_A) - (n+1)|/(n+1) \leq 5.0$, in particular $0.01 \leq |i(s_A) - (n+1)|/(n+1) \leq 2.5$, preferably $0.05 \leq |i(s_A) - (n+1)|/(n+1) \leq 1.5$, more preferably $0.07 \leq |i(s_A) - (n+1)|/(n+1) \leq 1.0$, and by particular preference $0.10 \leq |i(s_A) - (n+1)|/(n+1) \leq 0.8$. With such a deviation of the translation distance ratio from n+1, it is possible to account for a large number of requirement profiles of the drive train, and/or of the engineering design of the clutch plate of the multi-plate clutch that are relevant in practice.

The current translation distance ratio $i(s_A)$ between the open position of the contact plate and the maximum closed position of the contact plate, in particular between the open position of the contact plate and a closed position of the contact plate corresponding to the engaged position of the multi-plate clutch with unworn lining rings, preferably changes at least once; in particular, the current distance ratio $i(s_A)$ changes continuously. That makes it possible, in particular, to react automatically to wear of the friction linings of the lining rings. For example, a first translation distance ratio can be provided between the open position of the contact plate and a closed position of the contact plate with unworn linings in new condition, while a second translation distance ratio which differs from the first translation distance ratio can be provided between the closed position of the contact plate with unworn friction linings and the maximum closed position of the contact plate at the end of the wear range of the friction linings. That makes it possible to give optimal consideration to the wear that occurs on the friction linings in the repositioning of the contact plate and the separator plate coordinated with each other by the coupling mechanism, and for an especially comfortable engagement of the multi-plate friction clutch. In addition, it is possible through the stepwise and/or stepless change of the current translation distance ratio, to account for a large number of requirement profiles of the drive train and/or of the engineering design of the clutch plate of the multi-plate clutch that are relevant in practice.

By particular preference, the first lining ring has a first lining spring and the second lining ring has a second lining spring, the first lining spring being compressible maximally in the axial direction by a first axial distance $s_{BF1}$, and the second lining spring being compressible maximally in the axial direction by a second axial distance $s_{BF2}$ that differs from the first axial distance $s_{BF1}$, and where, in particular, $0.00 < 2|s_{BF1} - s_{BF2}|/(s_{BF1} + s_{BF2}) \leq 2.0$, preferably $0.05 \leq 2|s_{BF1} - s_{BF2}|/(s_{BF1} + s_{BF2}) \leq 1.7$, more preferably $0.10 \leq 2|s_{BF1} - s_{BF2}|/(s_{BF1} + s_{BF2}) \leq 1.5$ and by particular preference $0.20 \leq 2|s_{BF1} - s_{BF2}|/(s_{BF1} + s_{BF2}) \leq 1.0$. Due to the translation distance ratio differing from n+1, it is not necessary to demand the same lining spring for the lining rings that are used. As a result, it is possible, through conscious use of sufficiently differently acting lining resiliencies, to provide an individually adjusted closing characteristic for the multi-plate clutch, whereby additional comfort improvements can be realized when engaging the multi-plate clutch.

In particular, when the contact plate moves from the open position to a closed position of the contact plate, corresponding to the engaged position of the multi-plate clutch with unworn lining rings, the first lining ring and the second lining ring are frictionally compressible at different points in time and/or the compressing begins and/or ends at different points in time. Due to the intentionally time-differentiated beginning of the frictional grip of the lining rings it is possible, for example with the help of the lining ring having the first frictional engagement, for there to already be a first adjustment of rotational speed in a slipping mode, until torque can also be transmitted via a lining ring that produces friction subsequently, a smaller rotational speed difference being in effect at the lining ring that comes into frictional contact subsequently. The engagement of the multi-plate clutch can occur especially gently because of the successively occurring effectiveness of the lining rings, while because of the correspondingly high number of frictional pairings achieved by the lining rings an especially high maximum torque can be transmitted.

Preferably, the first lining ring has a first friction lining with an effective axial first friction lining thickness $d_1$, and the second lining ring has a second friction lining with an effective second axial friction lining thickness $d_2$ that differs from the first friction lining thickness $d_1$. In particular, $0.0 < 2|d_1 - d_2|/(d_1 + d_2) < 2.0$, preferably $0.01 \leq 2|d_1 - d_2|/(d_1 + d_2) \leq 1.8$, more preferably $0.05 \leq 2|d_1 - d_2|/(d_1 + d_2) \leq 1.5$, and by particular preference $0.10 \leq 2|d_1 - d_2|/(d_1 + d_2) \leq 1.0$. That makes it possible, in particular, to address the issue of different friction loads acting on the lining rings, for example if the lining rings are frictionally compressed at different times relative to one another. The different friction lining thicknesses are dimensioned in particular in such a way that under the expected friction load on the friction linings set by the coupling mechanism, the end of the wear range of the friction linings is reached essentially simultaneously.

By particular preference, it is provided that to form the coupling mechanism the contact plate is connected to the counter plate by means of a first leaf spring, the separator plate is connected to the counter plate by means of a second leaf spring, and the separator plate is supported on the contact plate by means of a contact pin that rests against the first leaf spring, or against the second leaf spring, or against some other element that forms a contact point. If the contact pin is connected to the separator plate, the contact pin is supported on the first leaf spring. With kinematic inversion, if the contact pin is connected to the contact plate, the contact pin is supported on the second leaf spring. To that end, the second leaf spring can be lengthened beyond the connecting point between the second leaf spring and the separator plate so that the contact pin is not supported on the second leaf spring between the connecting points of the second leaf spring, but rather the contact pin that is connected to the contact plate can be supported on the second leaf spring even outside of that area beyond the point of connection to the separator plate.

The refinements explained below relative to the simplified representation on the basis of the first alternative, in which the contact pin is supported on the first leaf spring, apply by analogy to the kinematic inversion of the second alternative, in which the contact pin is supported on the second leaf spring. Furthermore, the example of a refinement explained on the basis of the contact pin applies by analogy to the element forming the contact points, which deviates from the geometry of the contact pin. The first leaf spring in particular can move the contact plate automatically into a defined, especially an open, starting position, in the event of a non-exerted actuating force. The second leaf spring In particular can move the separator plate automatically into a defined position, especially an open starting position, in the event of a non-exerted actuating force. The operating principle of the coupling mechanism can be oriented in particular on the operating principle described in German published patent applications DE 100 13 857 A1, DE 10 2011 018 589 A1, and DE 10 2011 086 929 A1, the content of each of which is referenced here and is incorporated as part of the present invention. To set the desired translation distance ratio in particular, the contact pin can accordingly fit between the connecting points of the supporting leaf spring, and eccentrically relative to the extension of the leaf spring. The coupling mechanism can thereby be constructed very compactly, and can use components that have already been provided for some other purpose for the motion coupling of the separator plate to the contact plate.

In particular, the separator plate is supportable by means of at least two contact points on the first leaf spring that are offset relative to one another in the circumferential direction and/or in the radial direction, to change the current translation distance ratio $i(s_A)$, the at least two contact points being in particular part of the same contact pin. The knowledge is utilized here that when the contact plate is moved in the axial direction, the part of the first leaf spring that is connected to the contact plate is carried with it, while the opposite connecting point in the axial direction is fixed. As a result, the first leaf spring undergoes a proportionate swiveling motion in the axial direction, so that the angle at which the first leaf spring rests on the contact pin changes. By means of a corresponding geometric design of the contact pin and/or the provision of at least one additional contact pin, as the angle position relative to the contact pin changes during the axial movement of the contact plate in the closing direction, the leaf spring can first rest on the first contact point and subsequently on the second contact point, whereby the translation distance ratio can be changed depending on the axial position of the contact plate.

The contact pin preferably has a contact contour, in particular essentially convex, directed toward the first leaf spring, to change the current translation distance ratio $i(s_A)$, in particular continuously, at least in a segment of the axial movement of the contact plate. Through the geometric design of the contact contour of the contact pin, in particular to form a plurality of contact points, as the angular position relative to the contact pin changes during the axial movement of the contact plate toward the closing position, the first leaf spring is able to roll on the contact contour, whereby the translation distance ratio can be changed, in particular continuously, depending on the axial position of the contact plate.

By particular preference, the contact pin is connected to the separator plate and secured against rotation. The contact pin can form an anti-rotation protection with the separator plate, in particular by means of a cross section contour that deviates from a circular shape. As a result, the contact pin can be mounted in one relative angular position, preferably in exactly one only. A correct orientation of the at least one contact point and/or of the contact contour of the contact pin relative to the first leaf spring can be guaranteed thereby.

In particular, the contact pin is prestressed pliably in the axial direction with a spring force, and/or the contact pin is provided with an end stop, where the end stop blocks the movement of the contact pin in one axial direction and permits it in the opposite axial direction. If there is too strong an axial force acting on the contact pin, in particular with the multi-plate clutch in the engaged state, the contact pin can flex away or move away, so that damage to the first leaf spring, for example from a plastic deformation, can be avoided.

Preferably, the contact pin bends the first leaf spring in an axial direction in the maximum closed position of the contact plate, in particular in a closed position of the contact plate corresponding to the engaged position of the multi-plate clutch with unworn lining rings. The contact pin can bend the first leaf spring thereby, so that an especially compact design of the multi-plate clutch with a small axial construction space requirement is possible. The axial elasticity of the first leaf spring can be utilized thereby to save construction space.

By particular preference, the contact pin is riveted to the separator plate, with a contact point of the contact pin that contacts the first leaf spring being offset in the radial direction relative to a rivet shank of the contact pin, while in particular the contact point, seen in the direction of the rivet shank axis, is positioned completely next to the rivet shank cross section, and/or a bearing area used only for assembly appears as an extension of the rivet shank, the bearing area completely covering the rivet shank cross section. That enables a riveting tool, for example a riveting punch, to be positioned essentially coaxially to the rivet shank without changing the relative position of the contact point by a plastic deformation of the contact pin when riveting. That can guarantee functioning operation of the multi-plate clutch. Alternatively, the contact point can be provided in an axial extension of the rivet shank, in which case positioning surfaces are provided for positioning the riveting tool, in particular arranged symmetrically relative to one another, so that the riveting tool is not touching the contact point directly during riveting.

The present invention also relates to a dual clutch for coupling a drive shaft of a motor vehicle engine to a first transmission input shaft and/or a second transmission input shaft, with a first friction clutch for coupling the drive shaft to the first transmission input shaft and a second friction clutch for coupling the drive shaft to the second transmission input shaft, where the first friction clutch and the second friction clutch are designed as multi-plate clutches that can be designed and refined as described above.

BRIEF DESCRIPTION OF THE DRAWINGS

The present invention will be explained below by way of example, with reference to the accompanying drawings, on the basis of preferred exemplary embodiments; the features described below can each relate to an aspect of the present invention, both individually and in combination. The drawing figures show the following.

DESCRIPTION OF THE PREFERRED EMBODIMENTS

Figure 1:
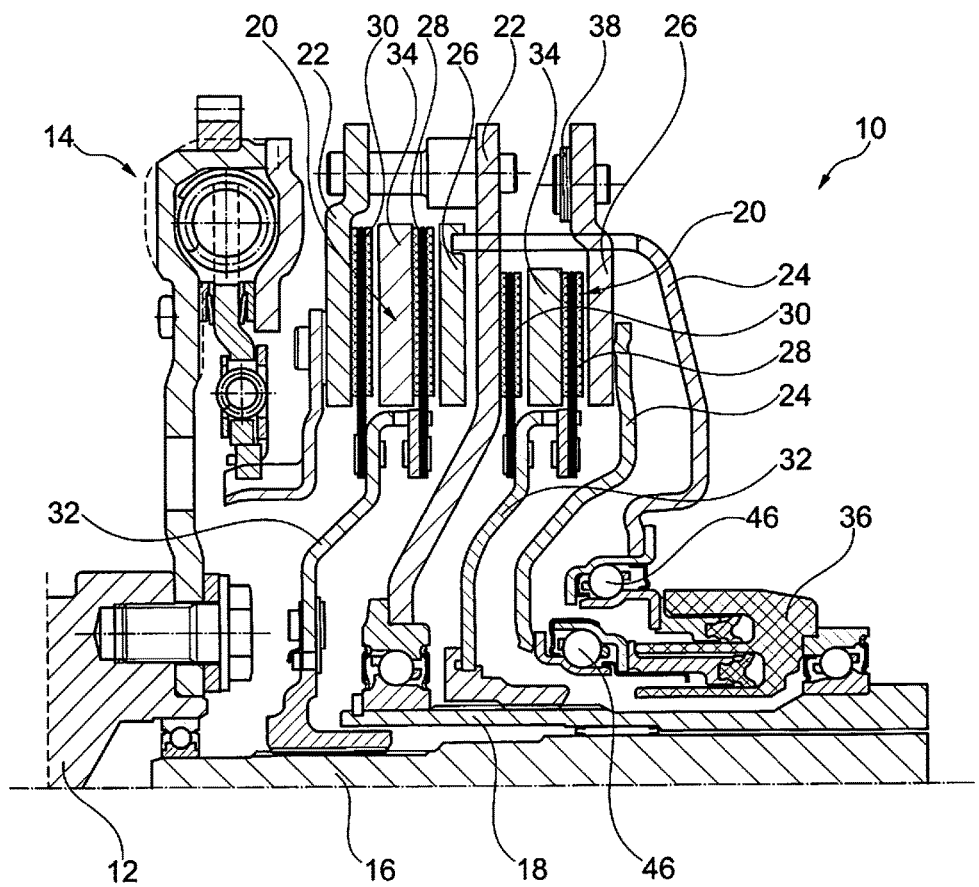
FIG. 1: a schematic longitudinal cross-sectional view of a dual clutch.

The dual clutch 10 shown in longitudinal cross section in FIG. 1 can couple a drive shaft 12, via a torsional vibration damper 14 in the form of a dual-mass flywheel, to a first transmission input shaft 16 and a second transmission input shaft 18. To that end, a pair of multi-plate clutches 20 is provided in each case, each of which clutches has a respective counter plate 22 rotatably coupled to the drive shaft 12, and a respective contact plate 26 that is movable with the help of a respective actuating element 24 in the form of a rigid actuating member. Each contact plate 26 can also move axially toward a respective separator plate 34 that is positioned between a respective first lining ring 28 and a respective second lining ring 30 carried by a respective clutch plate 32, each of which contact plates is movable axially relative to the respective first lining ring 28. To that end, an actuating force from a hydraulic actuating system 36 can be introduced into a respective actuating element 24, in particular to engage the respective multi-plate clutch 20. Each contact plate 26 is connected via a respective first leaf spring 38, and the respective separator plate 34 via a respective second leaf spring 40, at least indirectly, to the respective counter plate 22. Connected to the respective separator plate 34 is a respective contact pin 42 that makes contact with the respective first leaf spring 38, whereby a coupling mechanism 44 (see FIG. 4) is formed which motion-couples the separator plate 34 to the contact plate 26 in a defined translation distance ratio.

Various concepts are presented below for how the separator plates 34 can be axially guided in the contact plate path of the contact plate 26 in the correct translation distance ratio. The distinctive feature of the coupling mechanisms 44 presented here and based on leaf springs 38, 40 is that they can guide the separator plates 34 precisely in accordance with the requirements, even when there are friction packages of the clutch plate 32 having different plate and lining variants, and/or different removal volumes per lining ring 28, 30. Furthermore, a concept is also proposed that changes the translation distance ratio between the contact plate path of the contact plate 26 and the separator plate path of the separator plate 34, depending on the wear condition of the clutch 20.

Figure 3:
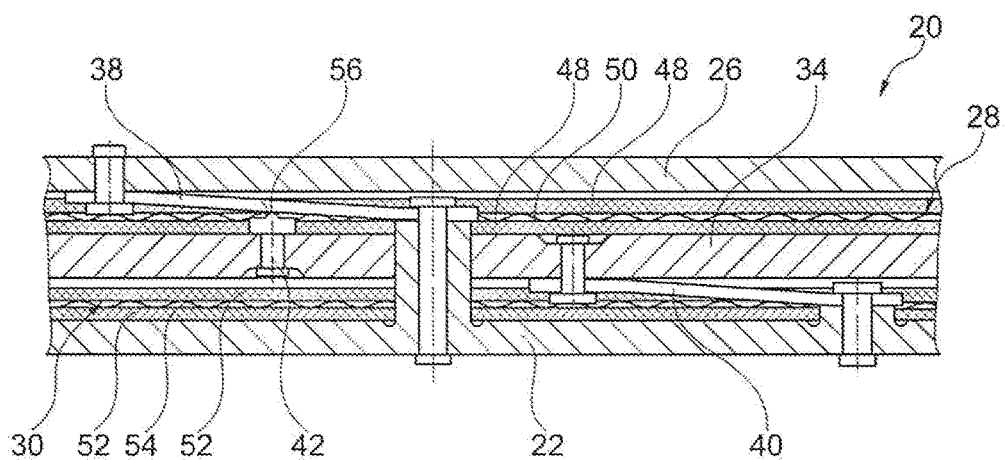
FIG. 3: a fragmentary schematic cross-sectional view of an implementation of a multi-plate clutch of the dual clutch of FIG. 1, FIG. 4: a fragmentary schematic cross-sectional view of the multi-plate clutch of FIG. 3 in a disengaged position.

The basic structure of the multi-plate dual clutch 10 is shown in FIG. 1. The actuating forces of the clutch actuation system 36 can be transmitted to the contact plates 26 of the sub-clutches 20 by means of respective actuation bearings 46 and respective actuation elements 24. The friction package of the respective sub-clutch 20 is then compacted by the contact force which thus develops. As shown in FIG. 3, the friction package contains the contact plate 26, the first lining ring 28, the separator plate 34, the second lining ring 30, and the axially stationary counter plate 22. The two lining rings 28, 30 of a sub-clutch 20 together form a multi-part clutch plate 32, each part of which is connected axially movably but torsionally rigidly to one of the transmission input shafts 16, 18. The contact plate 26 and the separator plate 34 are connected to the clutch 20 so that they are axially movable, but fixed in the radial and tangential directions. Since only the contact plate 26 is actively moved by the actuating system 36, the separator plate 34 moves depending on movement of the contact plate 26. The way the contact plate movement is distributed over the removal volume of the two lining rings 28, 30 depends on the movement of the separator plate 34 that is located between the two lining rings 28, 30 of the friction package (removal volume refers to the increase in the gap dimension between the plates 22, 26, 34 adjacent to the lining rings 28, 30 in excess of the clamped plate thickness). The way in which the separator plate 34 moves relative to the contact plate 26 thus has great influence on the behavior of the clutch 20. The correct movement diagram makes it possible to ensure that both lining rings 28, 30 of the clutch plate 32 can clear (disengage) correctly, and also when the individual lining rings 28, 30 become engaged or are again disengaged during the engaging or disengaging process. Since the movement of the separator plate 34 is important, the separator plate 34 should be guided exactly depending on the movement of the contact plate 26. To that end, various embodiments of the mechanical coupling mechanism 44 are presented below.

Figure 2:
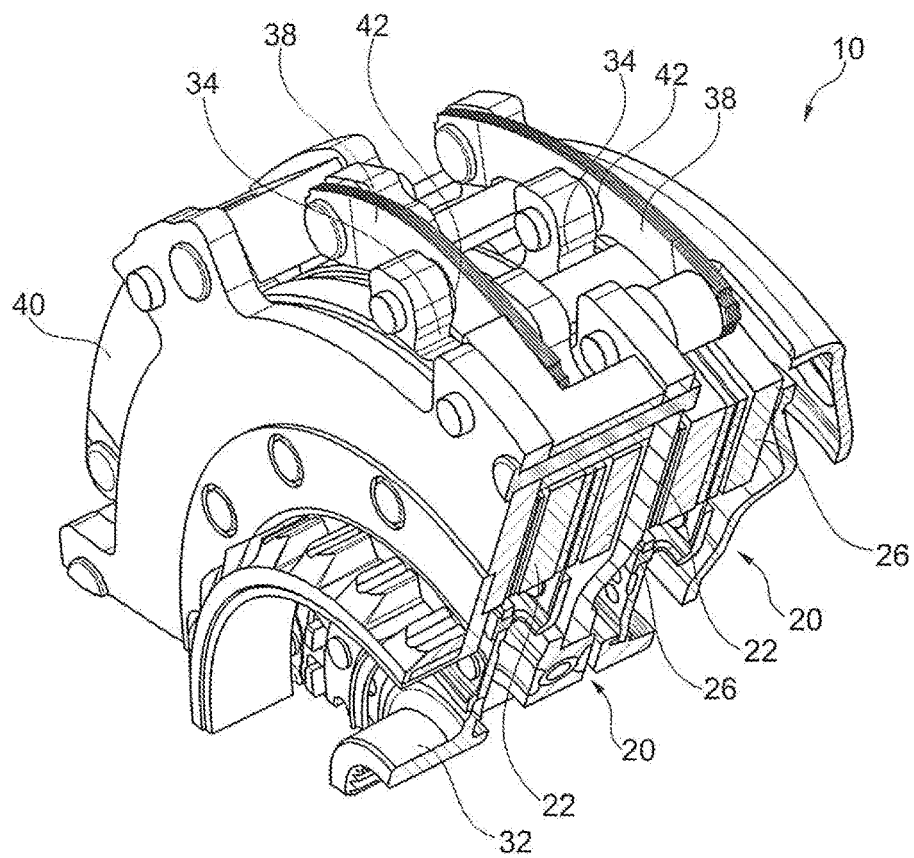
FIG. 2: a fragmentary perspective view of part of the dual clutch of FIG. 1.

As shown in FIGS. 2 and 3, the separator plates 34 and the contact plates 26 are connected by means of first and second leaf springs 38, 40, respectively, with parts that are fixed relative to the clutch. The leaf springs 38, 40 serve to center the plates 26, 34 and to transmit torque. At the same time, the leaf springs 38, 40 are elastic in the axial direction and thus make guided axial movement of the separator and contact plates 26, 34 possible. Both plates 26, 34 have a plurality of leaf springs 38, 40, or leaf spring assemblies, distributed around their circumference. In order to synchronize the separator plate movement in the correct relationship to the contact plate movement, the separator plate 34 is supported on one or more first leaf springs 38 of the contact plate 26.

The basic principle is shown in FIG. 3, in which the three plates—contact plate 26, separator plate 34, and counter plate 22—are shown schematically, between which the two lining rings 28, 30 of the clutch plate 32 are located. The first lining ring 28 has a first lining spring 50 provided on both sides with a first friction lining 48, while the second lining ring 30 has a second lining spring 54 provided on both sides with a second friction lining 52. Both the contact plate 26 and the separator plate 34 are connected by means of their own leaf springs 38, 40 to the counter plate 22, the latter of which is fixed relative to the clutch. Thus, the transmission of force and the centering occur in each case directly between the movable plate (contact plate 26 or separator plate 34) and the components that are fixed relative the clutch 20 (represented here by the counter plate 22), without tangential forces and centering effect being transmitted from one of the movable plates 26, 34 to the other.

Since FIG. 3 shows only a section of a simplified implementation, in each case only one leaf spring 38, 40 is visible, which holds the contact plate 26 and the separator plate 34. It makes sense, however, to distribute a plurality of leaf springs 38, 40 around the circumference, in particular uniformly, each of which is connected on one side to the movable plate 26, 34 and on the other side to a component that is fixed relative to the clutch 20. Three positions of leaf springs distributed around the circumference have proven especially effective for the arrangement of the leaf springs 38, 40. It is also possible for multiple leaf springs 38, 40 to be positioned (stacked) on top of one another. If the second leaf springs 40, which hold the separator plate 34, also always apply force to it in the direction of the contact plate 26, and thus in the disengagement direction of the clutch 20, simple contact points 56 are adequate to guide the separator plate 34. The contact points 56 do not lift off of the first leaf springs 38 when the clutch is disengaged 20 because of the axial force of the second leaf springs 40. Only when the clutch 20 is completely or partially engaged can the contact points 56 lift off when the lining springs 50, 54 of the two lining rings 28, 30 push the separator plate 34 into a different position than is provided for at that moment with the help of the leaf springs 38, 40 through the geometric distance coupling provided by the coupling mechanism 44 (see FIG. 4).

Figure 4:
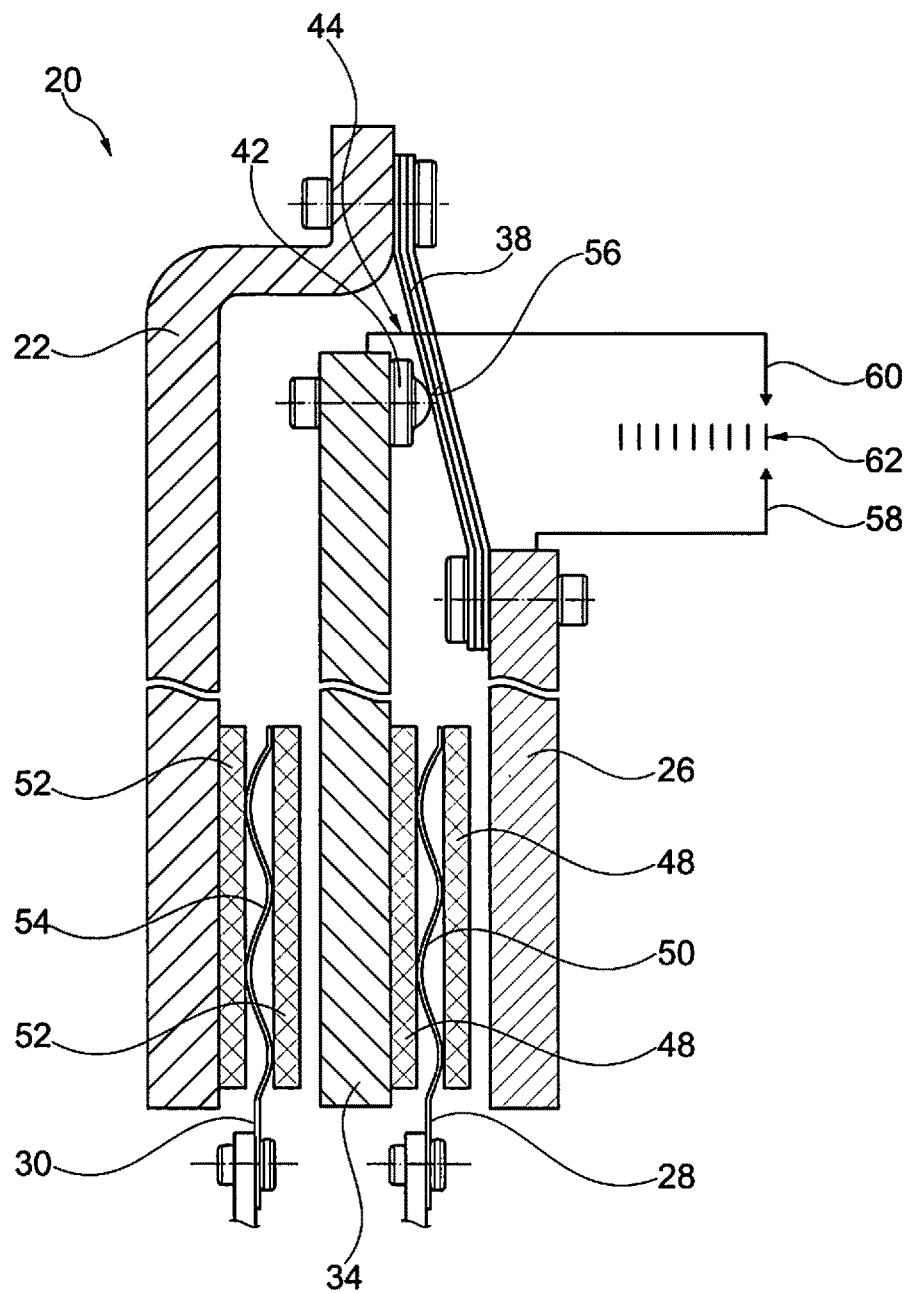

Referring to FIG. 4, to ensure that the separator plate 34 takes the correct position relative to the contact plate 26 and the counter plate 22, in particular with the clutch 20 disengaged, guiding or coupling mechanism 44 for the separator plate 34 is formed with the help of the first and second leaf springs 38, 40. As FIG. 3 shows, the separator plate 34 is supported on one or more first leaf springs 38 of the contact plate 26 in order to synchronize the separator plate movement in the correct ratio with the contact plate movement. Since the first leaf springs 38 are tied on one side to an axially fixed clutch component, counter plate 22, and on the other side to the contact plate 26, each leaf spring 38 carries out no axial movement on the counter plate side, and on the other side the axial movement of the contact plate 26.

The middle area of the first leaf spring 38 performs a smaller movement than the contact plate 26. How large that movement is depends on the circumferential position. The closer the approach to the connecting point on the contact plate 26, the greater the axial travel becomes. And leaf spring areas that are in the vicinity of the axially fixed connecting point perform almost no axial movement. Thus, the relationship of contact plate movement and separator plate movement can be established by choosing the right support position with the help of the contact pin 42. If the support point on the circumference of the clutch 20 is pushed in the direction of the contact plate attachment, the separator plate travel increases relative to the contact plate travel, and if the support point is shifted in the other direction, in the direction of the fixed connecting point, the separator plate travel is reduced. The first leaf spring 38 functions similarly to a lever that is used for distance translation. The coupling mechanism 44 of the two movable plates 26, 34 ensures that when the clutch 20 disengages, both lining rings 28, 30 of a clutch plate 32 are actually relieved and disengaged, and not, for example, that one lining ring 28, 30 is cleared too far and the other lining ring 30, 28 in exchange too little.

The exact function of the separator plate guidance with the help of the coupling mechanism 44 will now be described on the basis of the subsequent figures. A basic layout diagram will be used for that purpose, which shows the three plates—counter plate 22, separator plate 34, and contact plate 26—and the two lining rings 28, 30. Those parts shown in the lower area of the basic layout diagram correspond to a radial section through the clutch 20. Also shown is a first leaf spring assembly having a plurality of first leaf springs 38, which connects the contact plate 26 to the counter plate 22 and on which the separator plate 34 can be supported. The upper area of the basic layout diagram corresponds to the tangential course of the arrangement of the first leaf springs 38 in the clutch 20. To be able to better illustrate the movement of the movable plates 26, 34 in the figure, the contact plate 26 and the separator plate 34 are also each supplied with imagined pointers 58, 60 that indicate the movement or position change of the plates 26, 34 on an imagined fixed scale 62.

The first FIGS. 4 through 7 show the coupling mechanism 44 in the form of a leaf spring guide in a clutch 20 having two equivalently constructed lining rings 28, 30, in which the lining springs 50, 54, the necessary clearance distance, and the lining wear that occurs over the life of the clutch are exactly the same. An especially preferred embodiment of the invention will be explained later herein, when the solutions for the unequal lining rings 28, 30 are presented. However, for an easier start, and as a starting basis for the variants that are more difficult to understand, the coupling mechanism 44 for equally configured lining rings 28, 30 will nevertheless be described here.

FIG. 4 shows the leaf spring guide with the clutch 20 disengaged and with the contact plate 26 in an open position. Both lining rings 28, 30 are completely load-free, so that the lining springs 50, 54 have assumed their greatest thickness. In addition, the clutch 20 is disengaged, so that both between the counter plate 22 and the separator plate 34 and between the separator plate 34 and the contact plate 26 there is a larger spacing than the unclamped thickness of the lining rings 28, 30, and thus another gap exists between the lining rings 28, 30 and adjacent components 22, 34, 26, at least on one side of each lining ring 28, 30. Since the focus here is on a leaf spring assembly 38 of the coupling mechanism 44, for like lining rings 28, 30 the separator plate 34 is supported exactly in the middle of the free area of the first leaf spring assembly 38, and is not supported by its adjacent components 22, 26. In this embodiment, the contact point 56 is realized by a contact pin 42 in the form of a rivet with a round-topped head.

Figure 5:
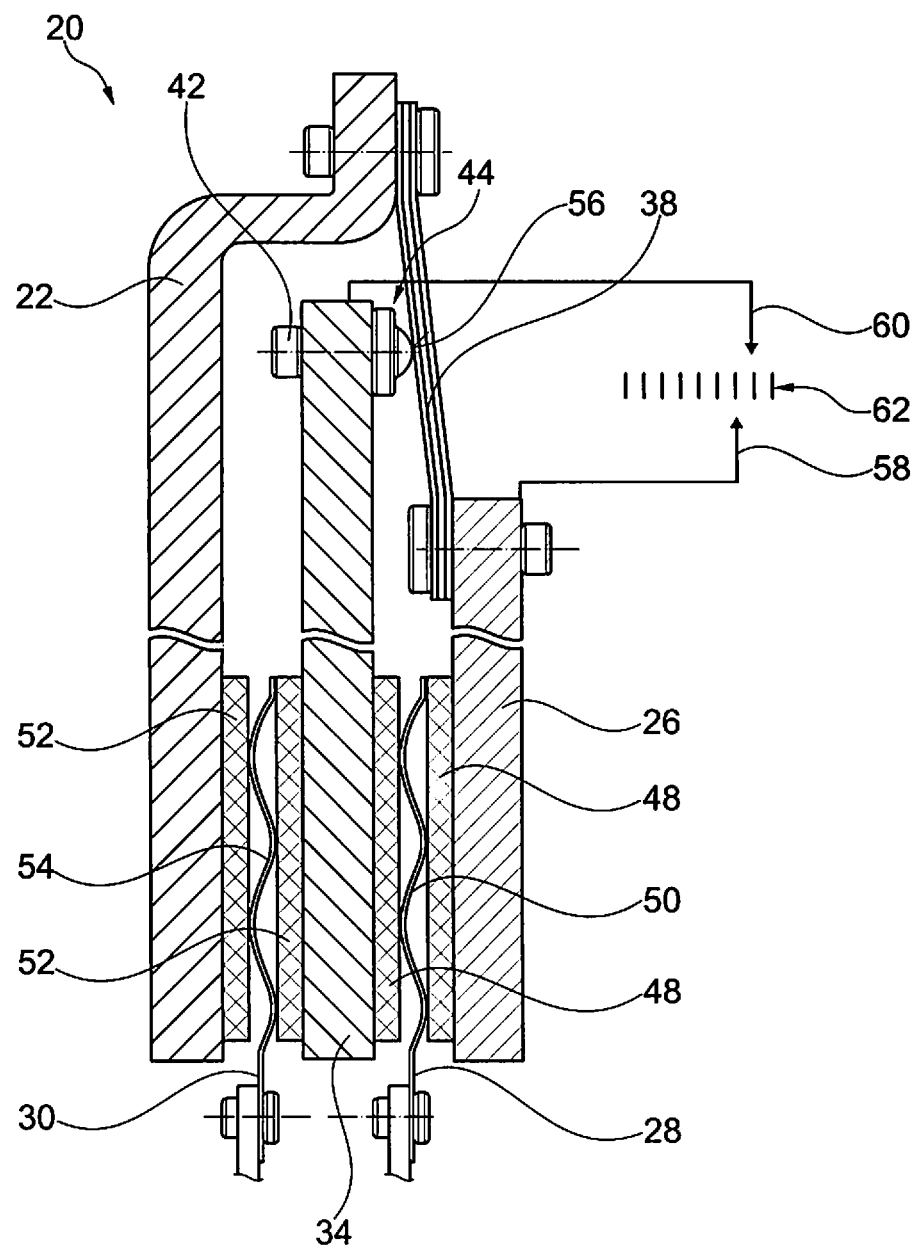
FIG. 5: a fragmentary schematic cross-sectional view of the multi-plate clutch of FIG. 3 in a partially engaged position.

FIG. 5 shows the coupling mechanism 44 with the contact plate 26 moved slightly inward toward separator plate 34. Since the separator plate 34 is supported exactly in the middle of the leaf spring assembly 38, in principle the separator plate travel is essentially exactly half as great as the travel of contact plate 26. That is also indicated by the two pointers 58, 60 on the scale 62. That reduces the axial spacing between the counter plate 22 and the separator plate 34 by the same measure as the axial spacing between the separator plate 34 and the contact plate 26. In the illustrated example, that has now led to the result that for both lining rings 28, 30 the gap between friction linings 48, 52 and separator plate 34, contact plate 26, and contact plate 22 has disappeared and the friction linings 48, 52 are now in contact with their respective adjacent components 22, 34, 26 on both sides.

Figure 6:
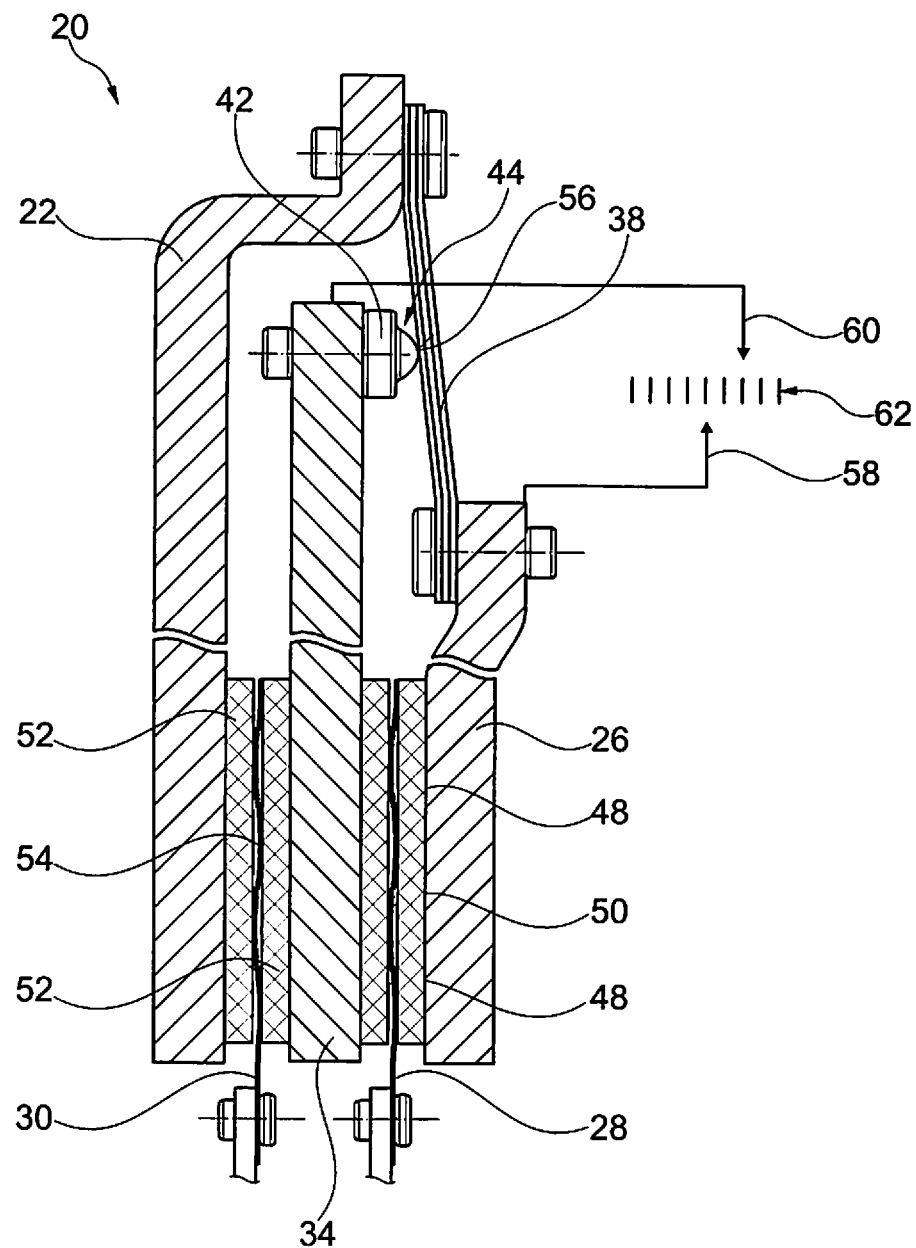
FIG. 6: a fragmentary schematic cross-sectional view of the multi-plate clutch of FIG. 3 in an engaged position and in unworn condition.
Figure 7:
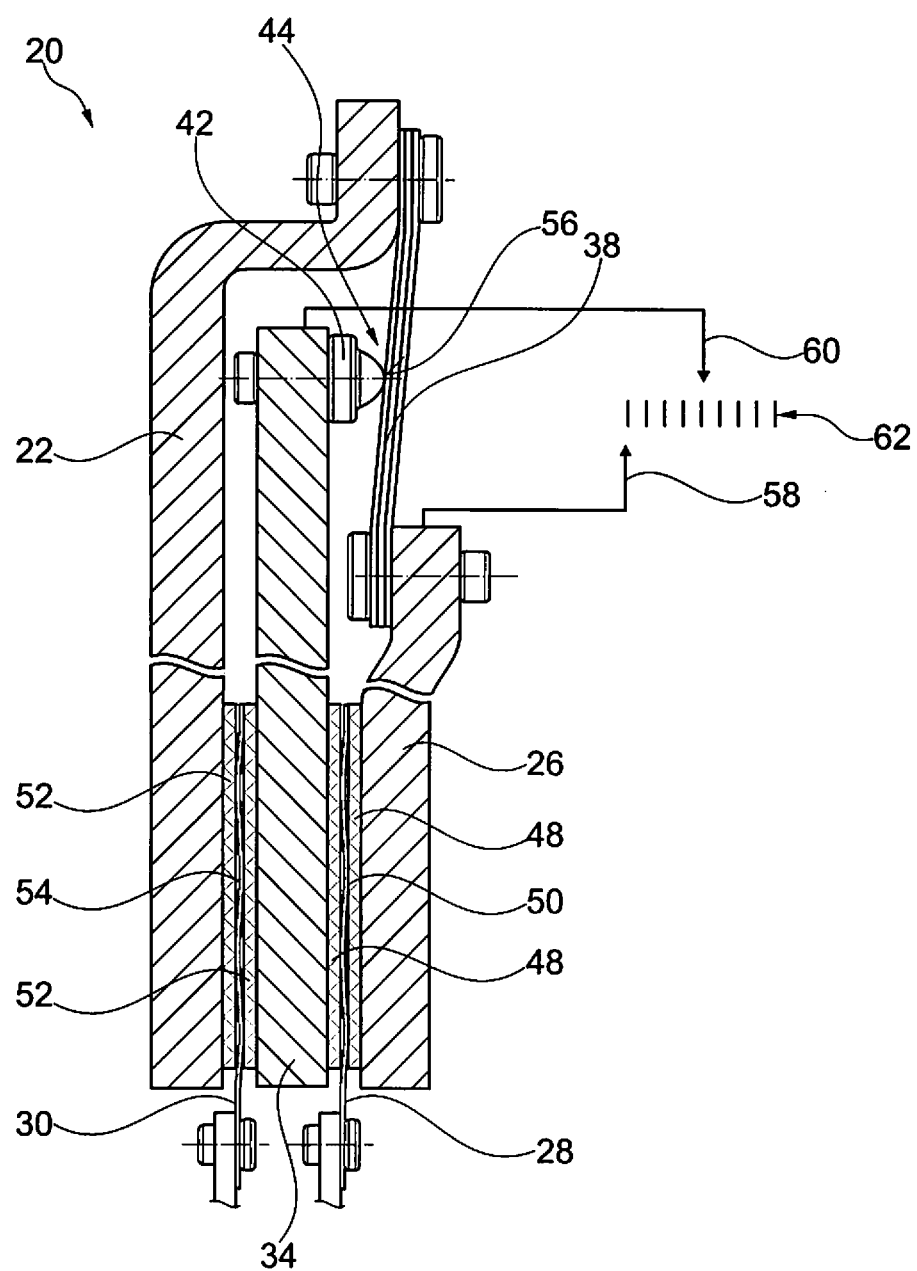
FIG. 7: a fragmentary schematic cross-sectional view of the multi-plate clutch of FIG. 3 in a maximum engaged position and in worn condition.
Figure 8:
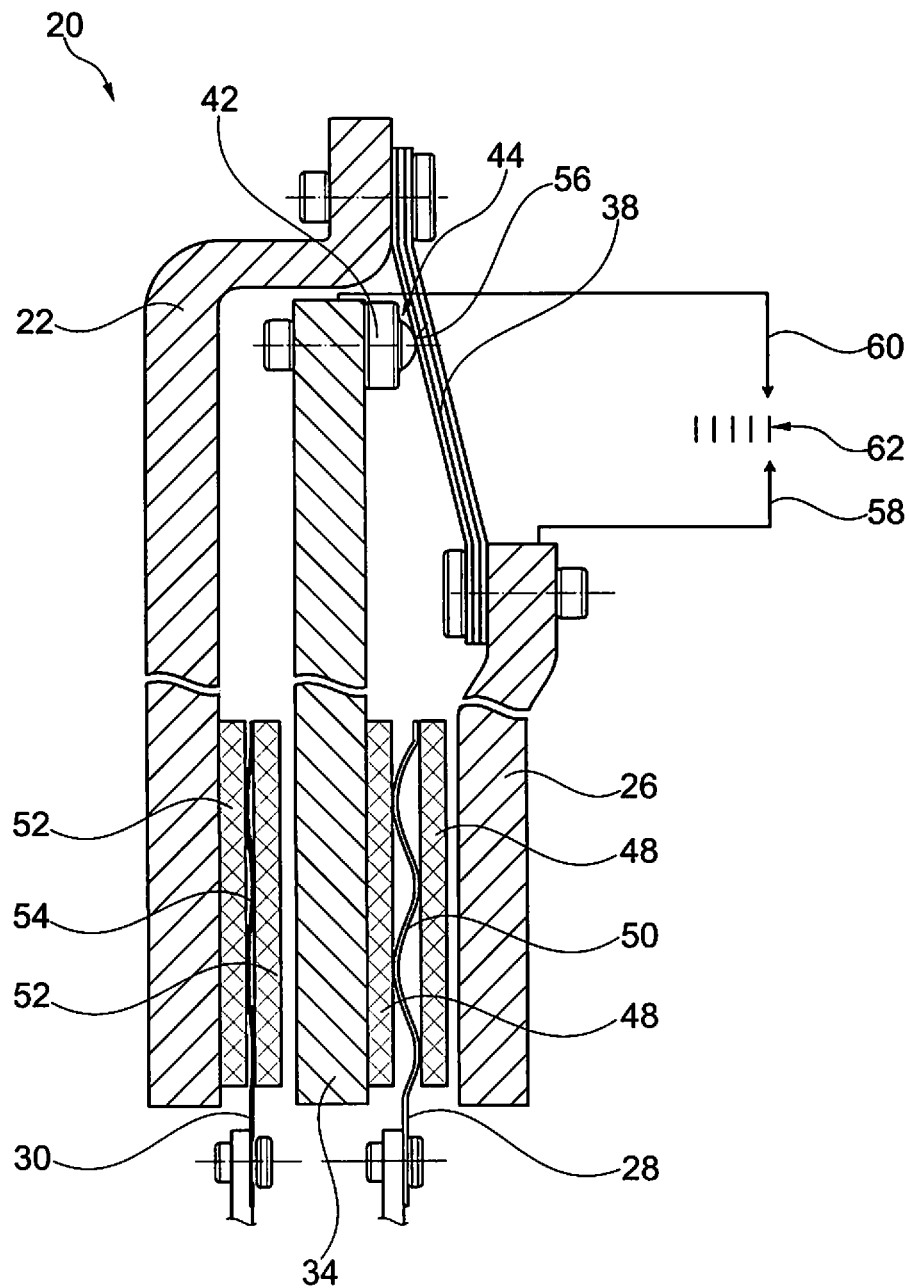
FIG. 8: a fragmentary schematic cross-sectional view of a first embodiment of a multi-plate clutch according to the present invention in a disengaged position.

In FIG. 6, the clutch 20 has been engaged still further, so that the lining springs 50, 54 of both lining rings 28, 30 have also been compressed. As soon as the lining springs 50, 54 of the two lining rings 28, 30 are compressed, their forces also act in the axial direction on the separator plate 34, and not only the forces of the leaf springs 38, 40 and of the coupling mechanism 44. With like lining rings 28, 30 having the same lining springs 50, 54, the separator plate 34 is always in axial force equilibrium when the lining springs 50, 54 of the two lining rings 28, 30 are each compressed the same amount. That is the case when the separator plate 34 is always moved half as far axially as the contact plate 26, whereby in this example the force equilibrium of the lining springs 50, 54 always act to place the separator plate 34 in the same position as the leaf spring guide 44. Both mechanisms, leaf spring guide 44 and the equilibrium force therefore work together without any problems. That is also true in the case of advancing lining wear, as long as it occurs with equal severity on both friction linings 48 and 52 (FIG. 7).

A preferred embodiment of the invention is shown in FIGS. 8 through 11, in which a leaf spring guide 44 for a clutch 20 having different lining rings 28, 30 that each carry different forms of lining springs 50, 52 is shown. To that end, by way of example, the second lining ring 30 between the counter plate 22 and the separator plate 34 is equipped with none or only a very axially narrow second lining spring 54. The first lining ring 28 between the separator plate 34 and the contact plate 26, on the other hand, has an axially wider first lining spring 50. Because of the different widths of lining springs 50, 54, the lining rings 28, 30 now also require different disengagement distances, so that both can be cleared sufficiently far but not farther than necessary. The separator plate 34, therefore, now no longer travels half the distance of the contact plate 26, but is guided by the coupling mechanism 44 so that it travels less than half of the contact plate distance. The separator plate 34, therefore, continues to be supported on the free leaf spring area between the two leaf spring linking points, but the support point is positioned so that its distance from the axially immovable attachment point of the first leaf spring 38 to the counter plate 22 is significantly shorter than the distance to the movable connection point of the first leaf spring 38 with the contact plate 26.

When different lining rings 28, 30 are used in a clutch 20, frequently not only the axial widths of the lining springs 50, 54 and/or the removal volumes, and/or that disengagement distances are different, but the ratios between the lining springing lengths and the disengagement distance can also be different. If that ratio is not the same, with the coupling mechanism 44 shown in this exemplary embodiment, which guarantees a constant (or approximately constant) translation distance ratio between the movable plates 26, 34, it is not possible to guarantee a simultaneous start of the torque build-up at both lining rings 28, 30 without having to accept an unwanted biasing of the clutch mechanism 44 when the clutch is completely engaged.

Figure 9:
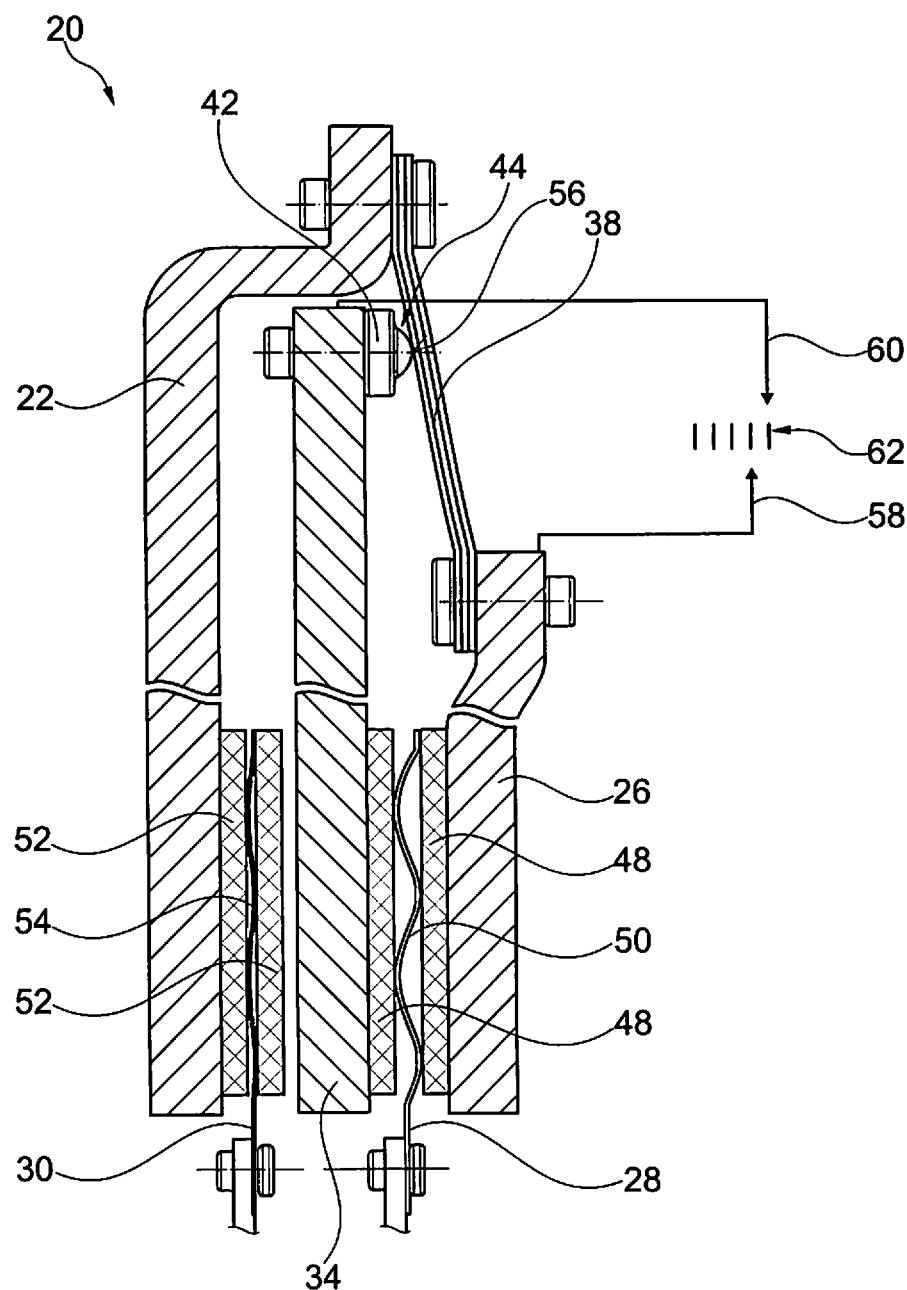
FIG. 9: a fragmentary schematic cross-sectional view of the multi-plate clutch of FIG. 8 in a partially engaged position.
Figure 10:
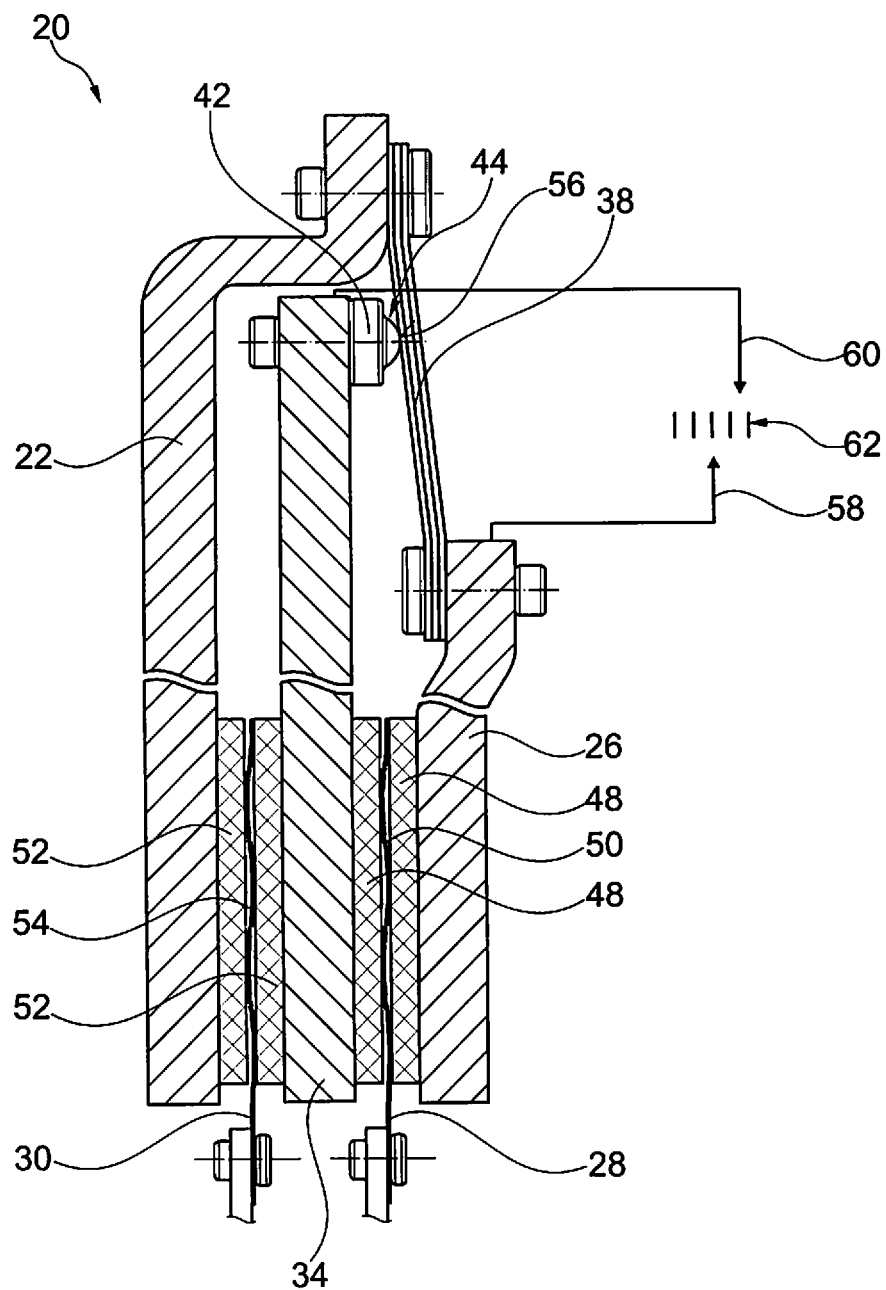
FIG. 10: a fragmentary schematic cross-sectional view of the multi-plate clutch of FIG. 8 in an engaged position and in unworn condition.

FIG. 9 shows that with that exemplary embodiment, when the clutch 20 is slightly engaged, the first lining ring 28 with the axially wide first lining spring 50 first touches its two adjacent components 26, 34, and the second lining ring 30 with the axially less wide second lining spring 54 is not yet clamped. The differing torque build-up is accepted intentionally with this exemplary embodiment, so that when the clutch 20 is completely engaged, the coupling mechanism 44 orients the separator plate so that the contact point 56 rests against the first leaf spring 38 with (almost) no force. To that end, the coupling mechanism 44 must place the separator plate 34 exactly in the position of axial force equilibrium of the two lining springs 50, 54 and the two separator plate leaf spring forces (see FIG. 10). The distance translation of the coupling mechanism 44 can naturally also only be coordinated with the clearance distances of the two lining rings 28, 30 without allowing for the different lining spring widths, so that the buildup of torque begins simultaneously at both lining rings 28, 30. But then the coupling mechanism 44 no longer becomes force-free when the clutch 20 is completely engaged, but is tensioned by the lining springs 50, 54, which act to push the separator plate 34 into a different position than the coupling mechanism 44. That can be accepted if the coupling mechanism 44 tolerates it (for example through first leaf springs 38 matched thereto as in FIG. 19 or by a pre-tensioned contact pin 42 as in FIG. 21).

Figure 11:
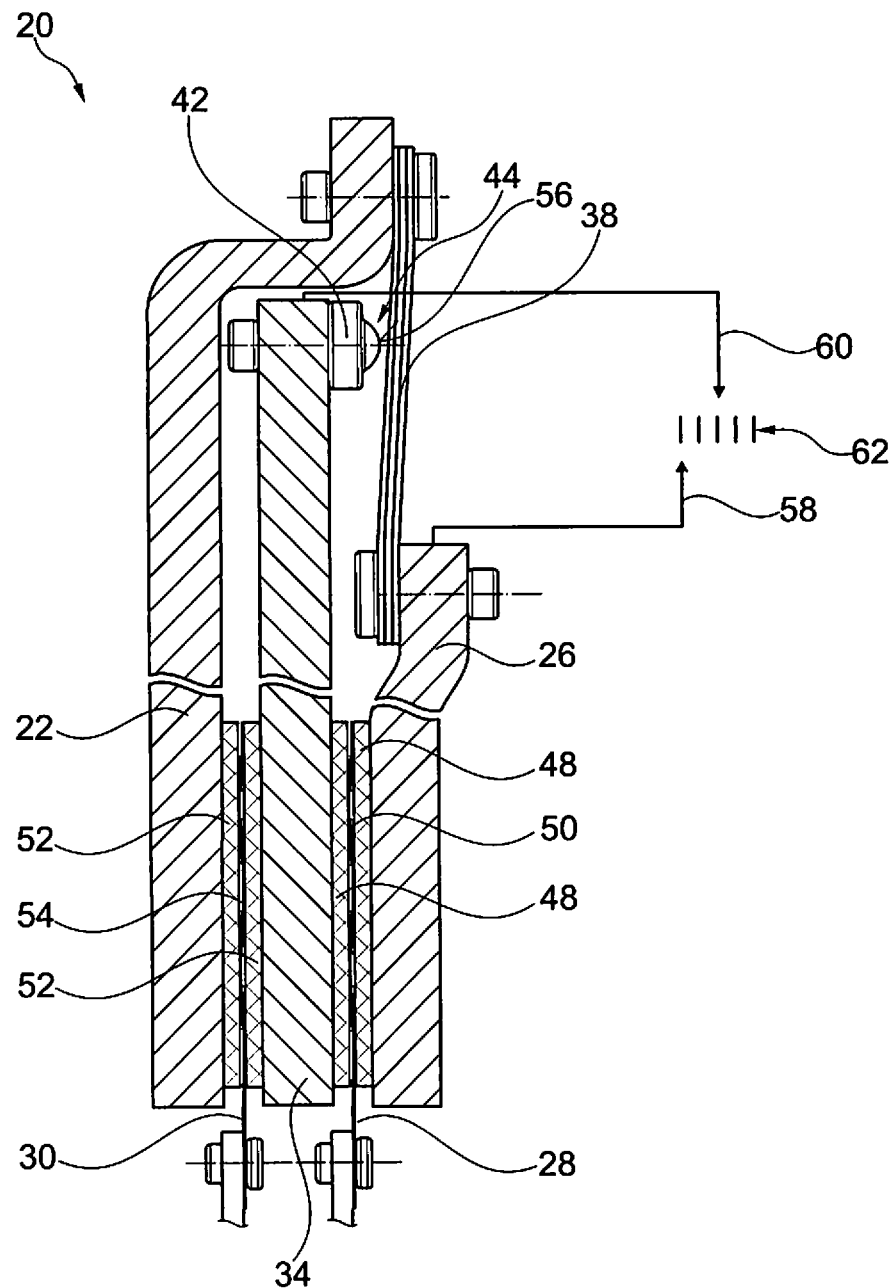
FIG. 11: a fragmentary schematic cross-sectional view of the multi-plate clutch of FIG. 8 in a maximum engaged position and in worn condition.
Figure 12:
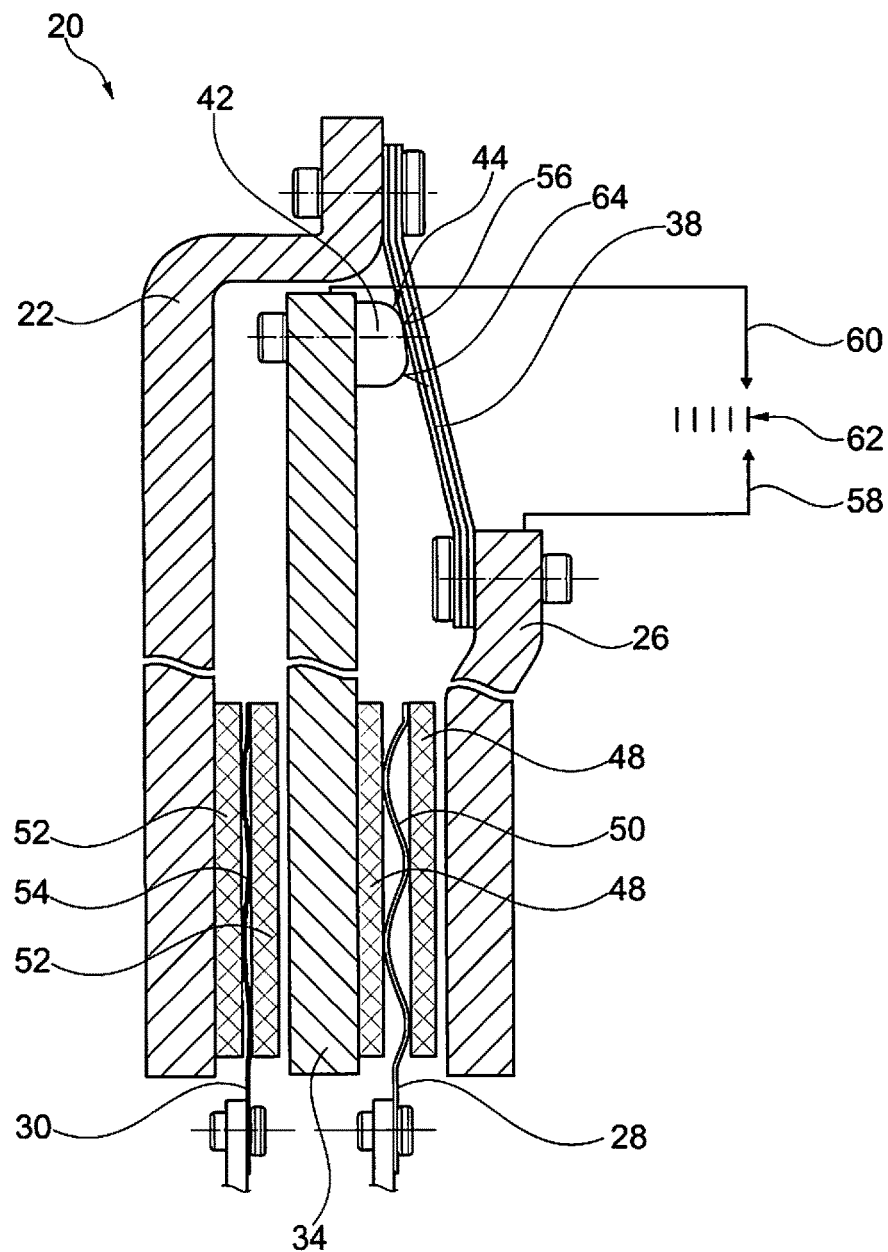
FIG. 12: a fragmentary schematic cross-sectional view of a second embodiment of a multi-plate clutch according to the present invention in a disengaged position.

The axial distances that the contact plate 26 and the separator plate 34 travel also change during operation of the clutch 20, since the friction linings 48, 52 of the lining rings 28, 30 wear. The lining wear on the two lining rings 28, 30 of a clutch plate 32 occurs uniformly in most cases, so that both lining rings 28, 30 become thinner by about the same amount over time. The contact plate 26 must therefore be moved axially farther and farther inward in order to compress the friction package completely. But since the coupling mechanism 44 of this exemplary embodiment always wants to move the separator plate 34 less than half the distance of the contact plate, the coupling mechanism 44 does not guide the separator plate 34 far enough to bring the separator plate 34 actively into the equilibrium position of the lining springs 50, 54 and the leaf spring forces with the same lining wear. The result is that the contact point 56 connected to the separator plate 34 lifts off of the first leaf springs 38 (FIG. 11).

As the description of the exemplary embodiments shown in FIGS. 8 through 11 shows, with a constant distance translation of the coupling mechanism 44 it is not possible to react individually to boundary conditions that change the distance relationships between the two lining rings 28, 30. A remedy is provided by a coupling mechanism 44 providing changeable axial distance translation. That axial distance translation change can be achieved, for example, by two spaced contact points 56, 64 per contact pin 42 between the separator plate 34 and the first leaf springs 38. Starting from a certain engagement travel, the first leaf spring 38, because of its changed inclination, rests on the formerly non-bearing second contact point 64, and in exchange releases the first contact point 56, which had been in contact until then. Since the two contact points 56, 64 are offset around the circumference of the clutch 20 and thus are at different distances from the axially fixed and the axially movable tie-in of the first leaf spring 38, the distance translation of the coupling mechanism 44 changes.

The operating principle is illustrated in FIGS. 12 through 15. The basic layout diagrams of FIGS. 12 through 14 differ from the embodiments shown in FIGS. 8 through 10 only by the existence of the second contact point 64 of the contact pin 42. The lining rings 28, 30, the contact plate paths, the separator plate path and the behavior of the clutch 20 are exactly as described before. Only when the friction linings 48, 52 are worn does the second contact point 64 come to bear. And because the change of the contact points 56, 64, and thus the change of the translation distance is distance-dependent, depending on the axial position of the contact plate 26, a clutch 20 with little wear will also travel only a small distance with the second translation distance stage, and a severely worn clutch 20 a large distance. That makes it possible to tune the ratio of the distances that the separator plate 34 travels with the first translation distance ratio and the second translation distance ratio, so that it always corresponds to the ratio of the disengagement distance in new condition and the increase in disengagement distance due to wear. Hence, it is possible that both with a new clutch 20 and with a completely worn clutch 20 the coupling mechanism 44 is always force-free, or at least almost force-free, when the clutch 20 is fully engaged and fully closed for maximum transmission of torque.

The change of the translation distance can be achieved not only by two spaced contact areas 56, 64, but also by a continuous contact contour 66 (see FIGS. 21 through 24), on which the first leaf spring 38 rests at different locations depending on its angular position. It is possible then, through the form of the contact pin 42 to determine not only the largest and smallest translation distance of the coupling mechanism 44, but also the course of the translation distance change. A continuous contact contour 66 therefore provides for a continuous translation distance change, in which all intermediate values of the translation distance occur. When and how rapidly the translation distance changes can be controlled by the three-dimensional form of the contact contour 66. To achieve a continuous translation distance change with flat first leaf springs 38, convex contact contours 66 in particular are employed. Alternatively, the contact pin 42 can also be designed with more than two contact points 56, 64, so that more than two translation steps are also produced. With a coupling mechanism 44 having multiple translation distance steps or a continuous translation distance change, at the beginning of the engaging process, for example, the coupling mechanism 44 can provide a translation distance ratio that is matched to the clearance distances of the two lining rings 28, 30. Next, the translation distance ratio can change, so that it is optimally tuned for the lining spring deflection distances, and then the coupling mechanism 44 can adjust to the anticipated lining wear with a new translation distance change.

Figure 13:
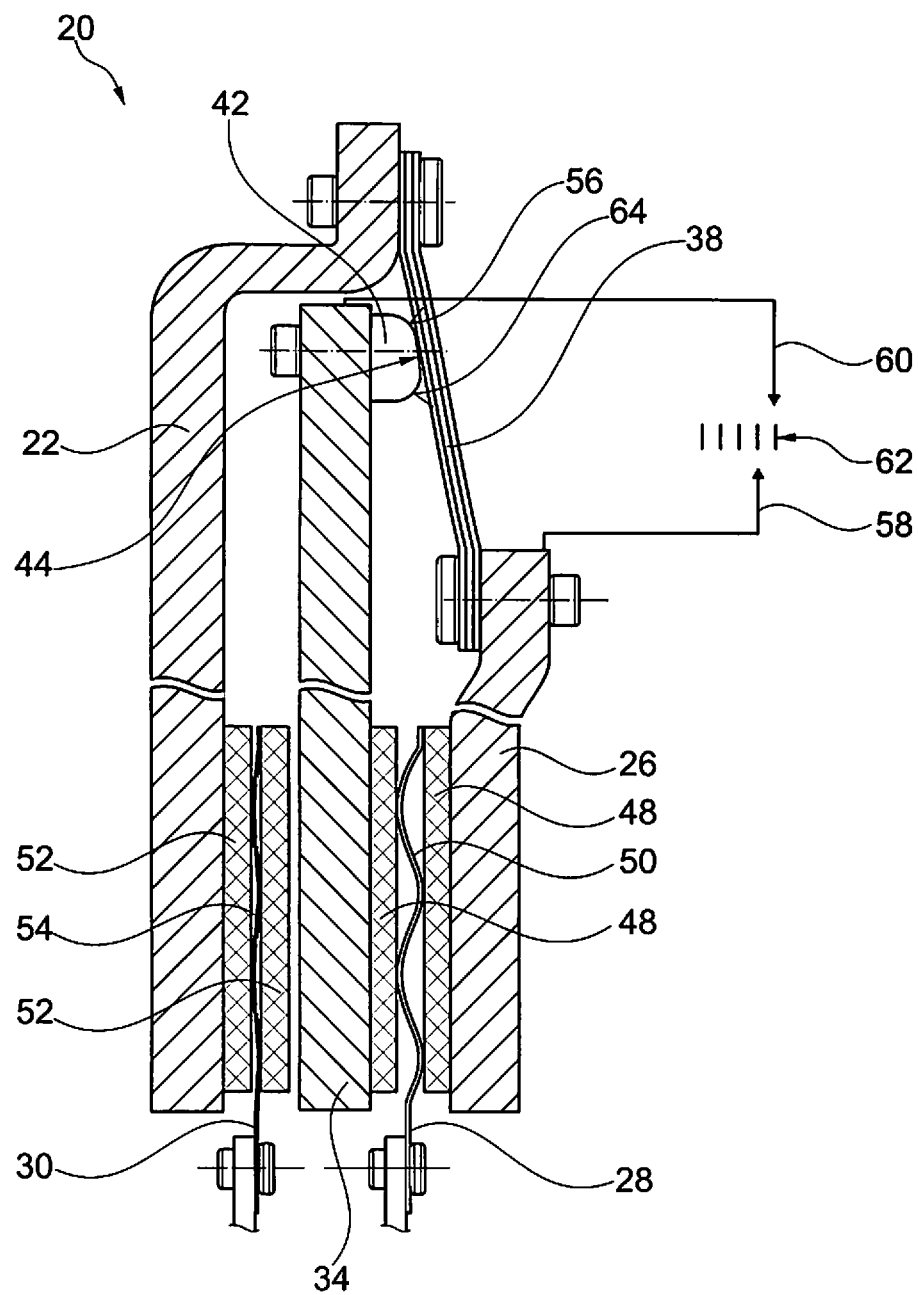
FIG. 13: a fragmentary schematic cross-sectional view of the multi-plate clutch of FIG. 12 in a partially engaged position.
Figure 14:
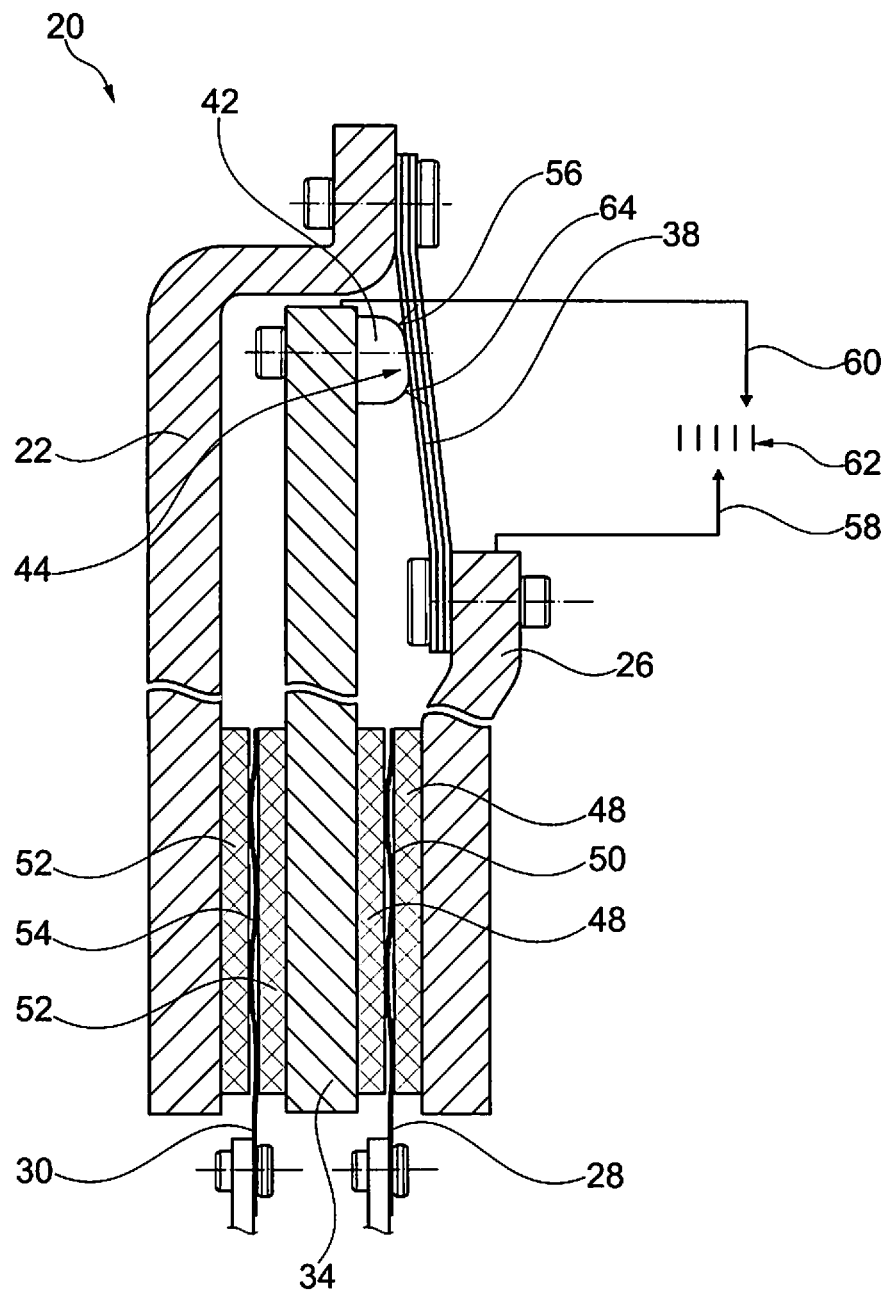
FIG. 14: a fragmentary schematic cross-sectional view of the multi-plate clutch of FIG. 12 in an engaged position and in unworn condition.
Figure 15:
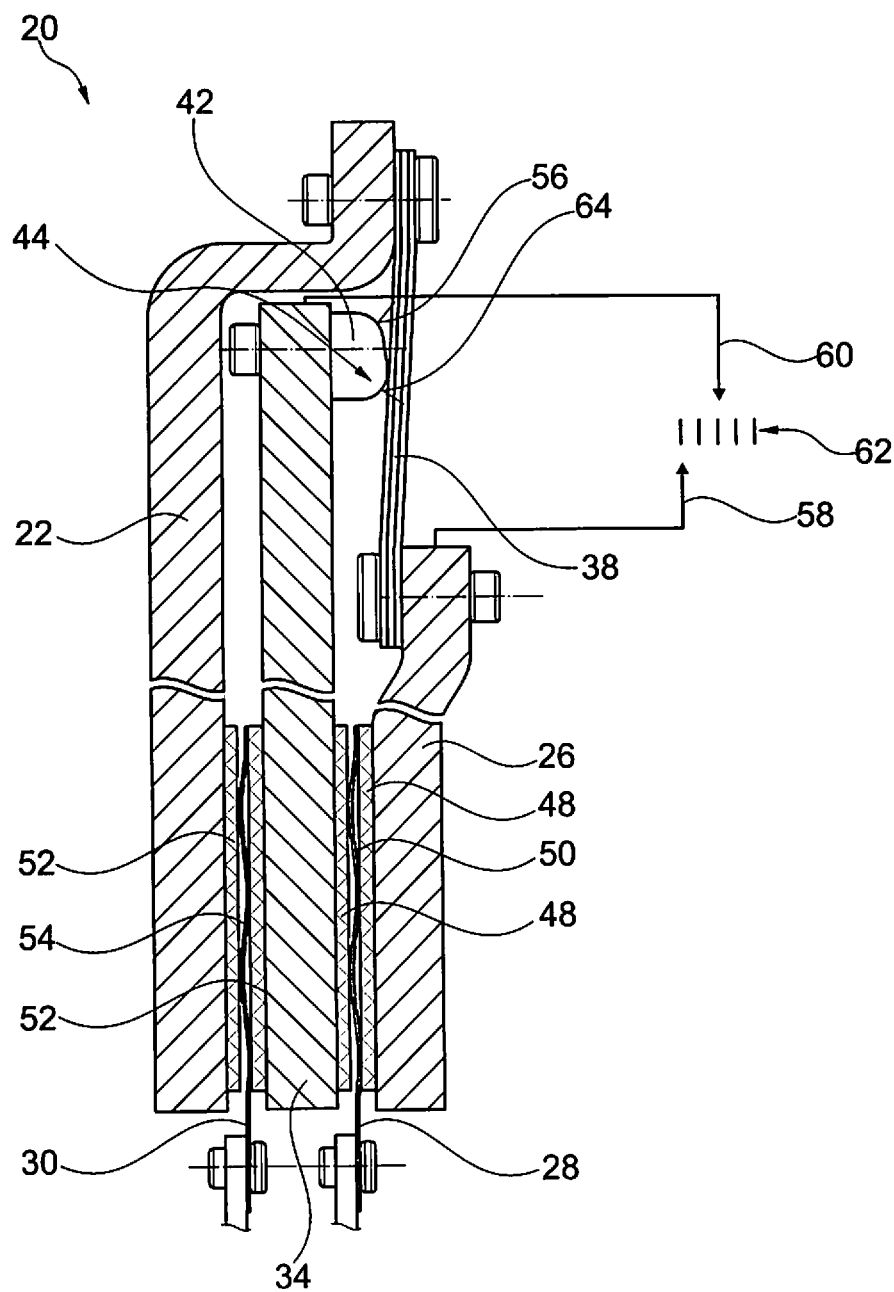
FIG. 15: a fragmentary schematic cross-sectional view of the multi-plate clutch of FIG. 12 in a maximum engaged position and in worn condition.
Figure 16:
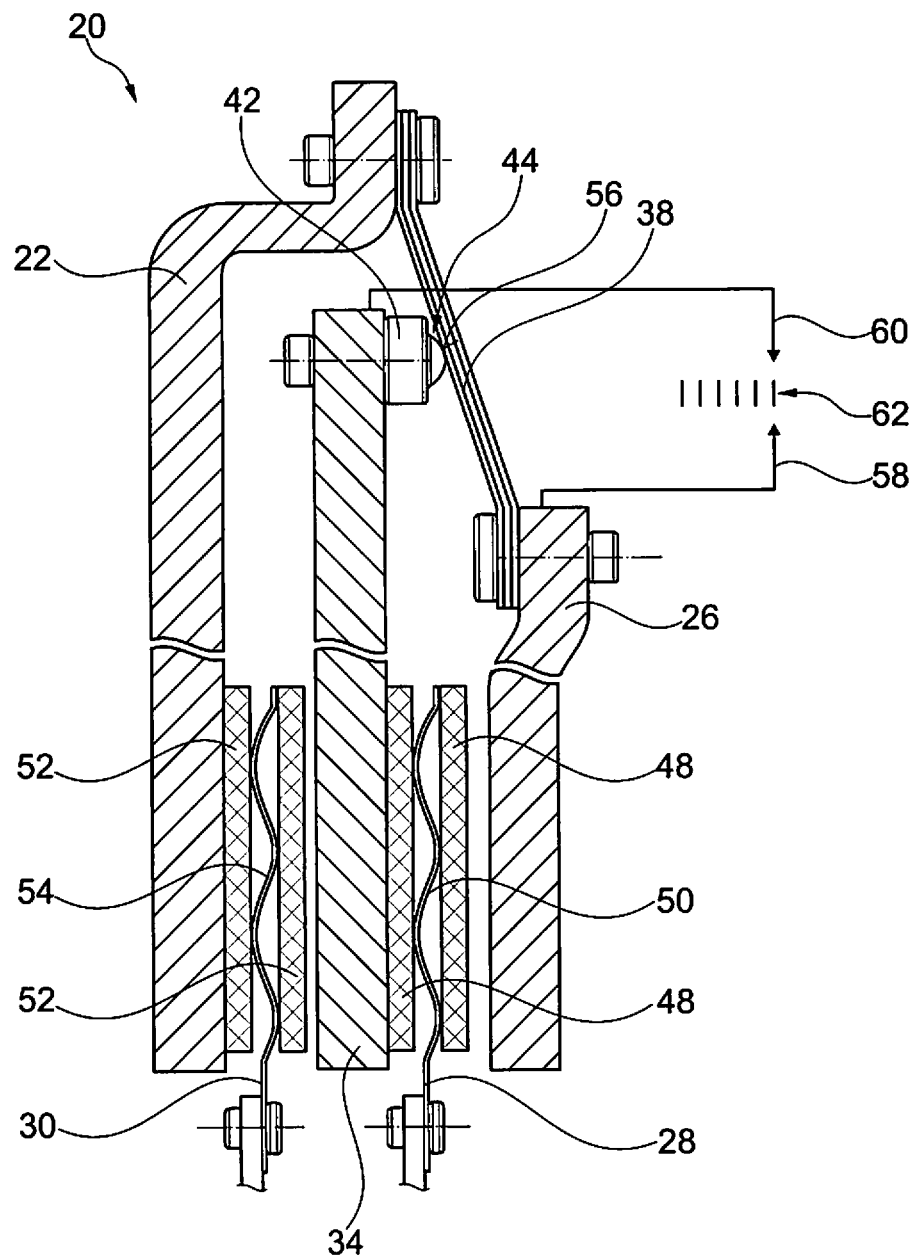
FIG. 16: a fragmentary schematic cross-sectional view of a third embodiment of a multi-plate clutch according to the present invention in a disengaged position.
Figure 17:
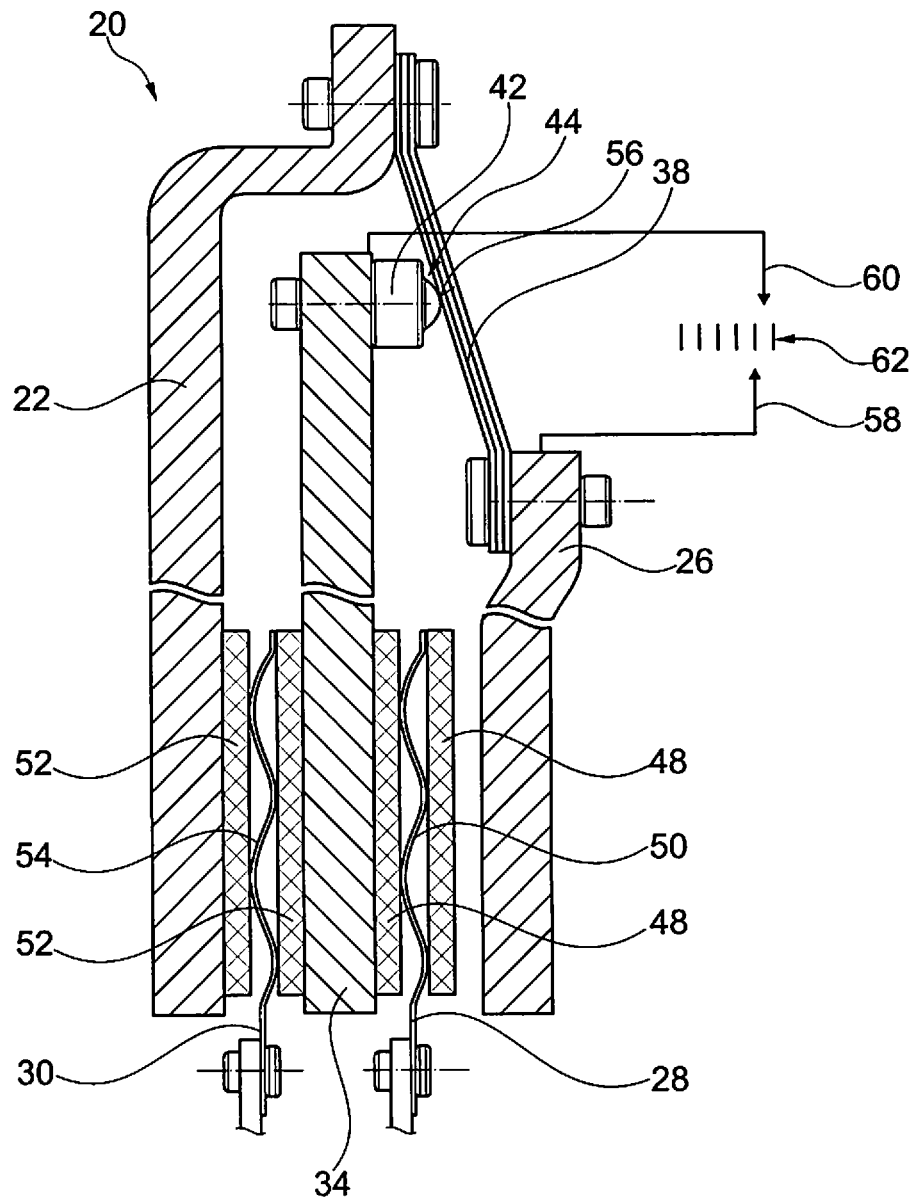
FIG. 17: a fragmentary schematic cross-sectional view of the multi-plate clutch of FIG. 16 in a partially engaged position.
Figure 18:
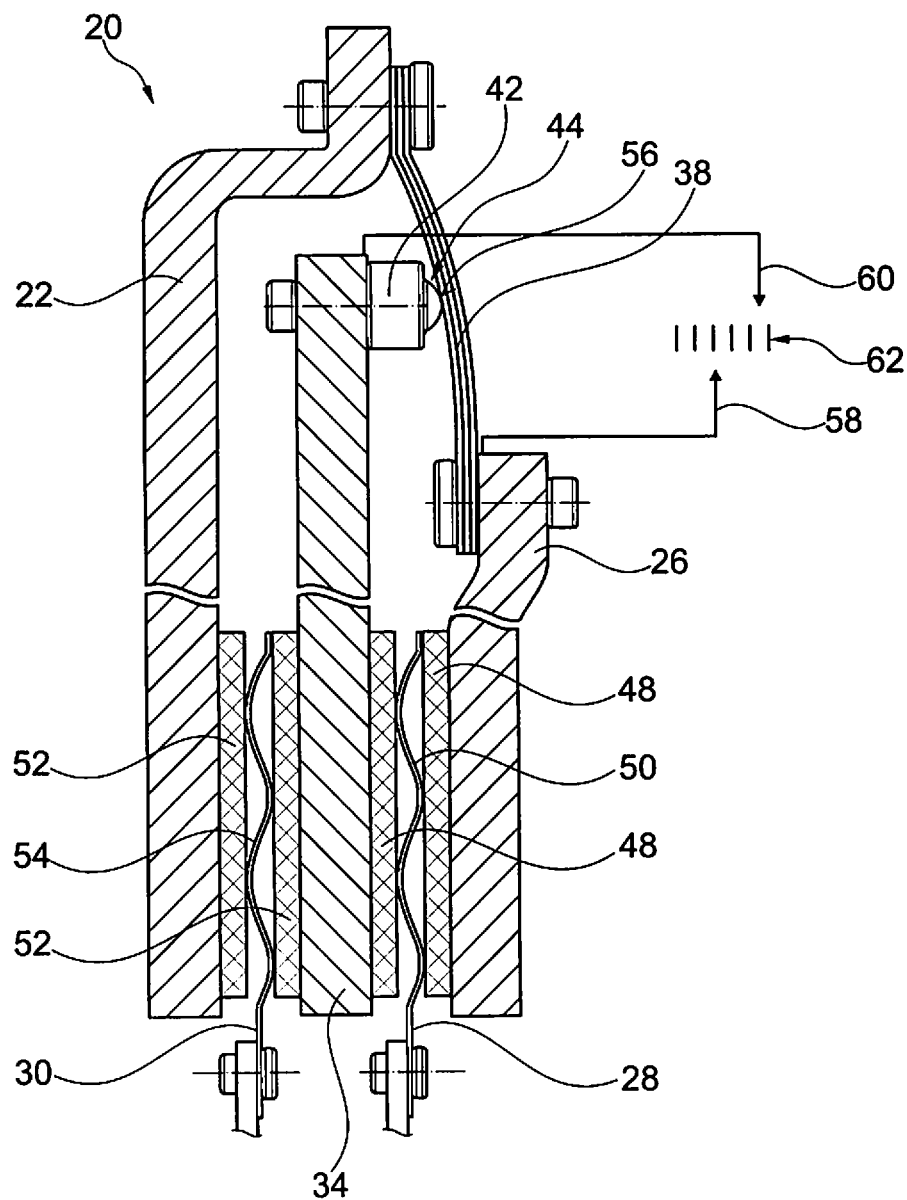
FIG. 18: a fragmentary schematic cross-sectional view of the multi-plate clutch of FIG. 16 in an engaged position and in unworn condition.
Figure 19:
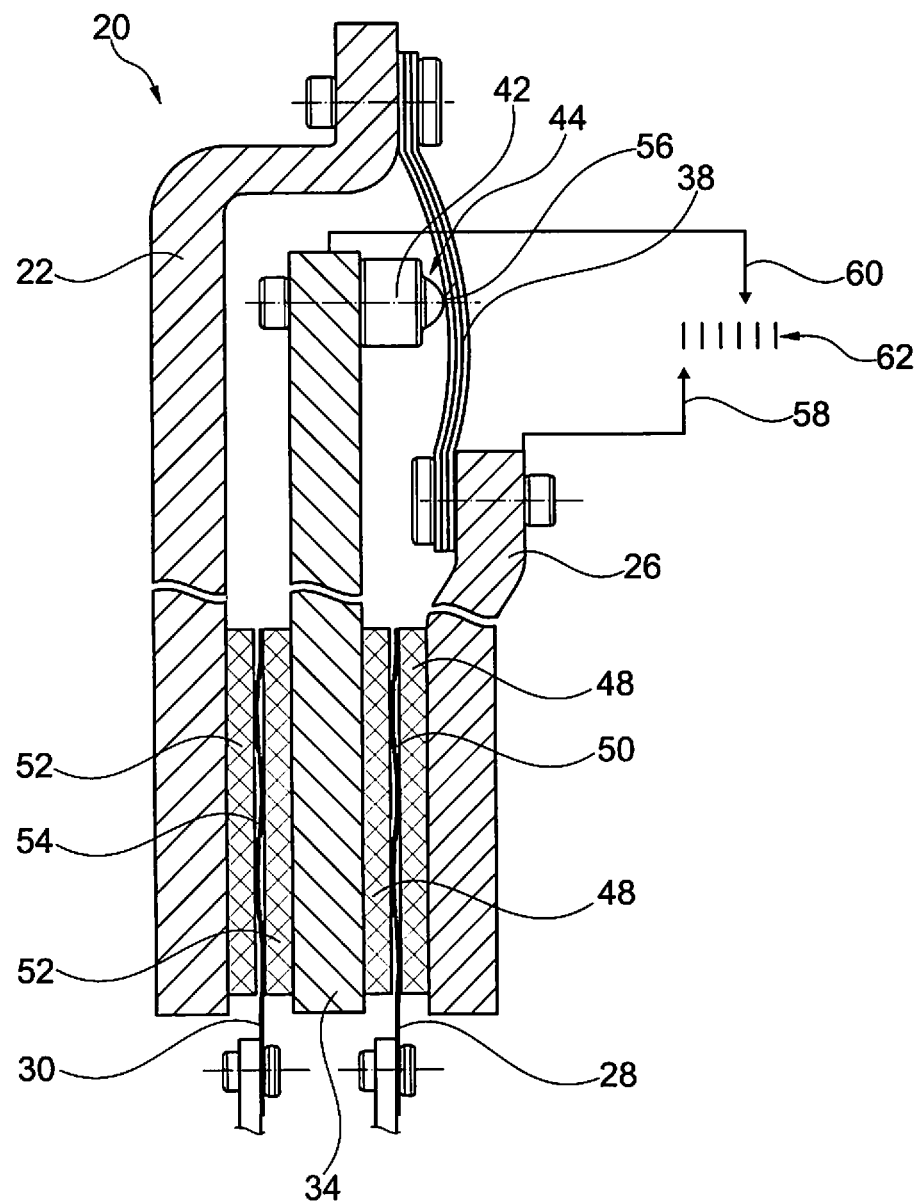
FIG. 19: a fragmentary schematic cross-sectional view of the multi-plate clutch of FIG. 16 in a maximum engaged position and in worn condition.
Figure 21:
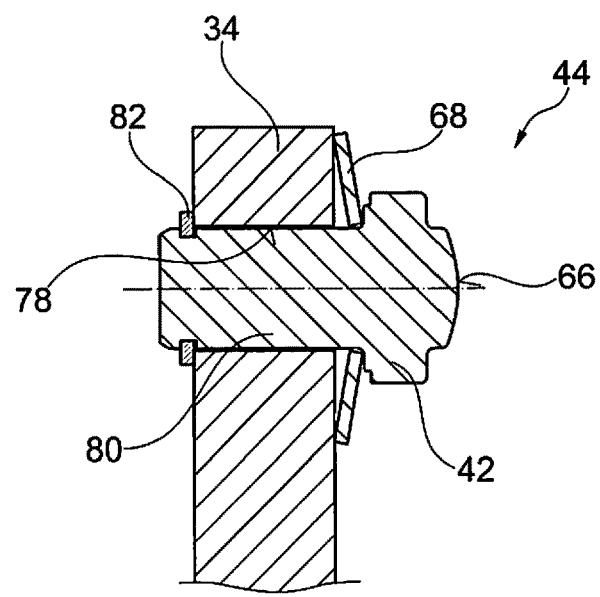
FIG. 21: a fragmentary schematic cross-sectional detail view of a portion of a fifth embodiment of a contact pin of a multi-plate clutch according to the present invention.

As described for the previous exemplary embodiments, it is possible that the torque build-up does not begin simultaneously in the two lining rings 28, 30 of a sub-clutch 20. Since the number of effective friction surfaces influences how much torque can be transmitted at a certain contact force, the clutch properties can be influenced greatly by the simultaneous or staggered torque build-up. Depending on the demands made on the clutch 20, a simultaneous or staggered start of the torque transmission can make sense. How the torque build-up takes place can be determined by the translation distance of the coupling mechanism 44 and/or the disengagement distance. So, FIG. 5, for example, shows a simultaneous start of torque, and FIGS. 9 and 13 show examples in which the first lining ring 28 on the contact plate side is the first to come into contact. Another exemplary embodiment, in which the second lining ring 30, which fits against the counter plate 22, is the first to come into contact, is shown in FIGS. 16 through 19. To make it clear that the different torque build-up occurs not only with different lining rings 28, 30, two like lining rings 28, 30 are used in the basic layout diagrams, whereas preferably differently configured lining rings 28, 30 can be utilized So that the second lining ring 30 is the first to make contact with the counter plate 22, on the one hand it is less strongly cleared than the other first lining ring 28 on the contact plate 26, and on the other hand the translation distance of the coupling mechanism 44 is tuned so that the separator plate 34 travels more than half the contact plate distance (FIGS. 16 and 17). The two measures, which are combined here, can also lead to the desired result individually. If the clutch 20 is engaged further after the start of torque transmission caused by the second lining ring 30 in contact with the counter plate 22, because of the lining spring force building up on one side, the separator plate 34 does not travel as far as it theoretically should because of the translation distance ratio of the coupling mechanism 44. That increases the force at the contact points 56 between the separator plate 34 and the first leaf springs 38, and the components—in particular the first leaf springs 38—are bent elastically (FIG. 18). If the first leaf springs are designed for that additional bending load, longer engagement distances can be realized, such as occur for example due to lining wear (FIG. 19). Alternatively, the elastic deformation can also be distributed over additional spring elements 68. FIG. 21 shows for this, for example, a contact pin 42 pre-tensioned in the separator plate 34 with the help of the spring element 68, for example in the form of a diaphragm spring. If the contact force exerted by the contact pin 42 on the first leaf spring 38 exceeds the force of the pre-tensioned spring element 68, then the contact pin 42 is shifted relative to the separator plate 34, and it thereby reduces the bending of the first leaf spring 38.

In the coupling mechanisms 44 described here, the first leaf springs 38, which hold the contact plate 26, fulfill three basic tasks. They hold and center the contact plate 26, they always press the contact plate 26 in the disengagement direction, and they serve as a translation lever for the coupling mechanism 44 of the separator plate 34. Those tasks can also be distributed among various components. The coupling mechanism 44, as it is presented here, has a translation element that is connected on one side to a component that is fixed axially relative to the clutch 20, and on the other side is moved along with the contact plate movement, so that between the two outer tie-in points the correct axial distance for the separator plate 34 can be measured out. Whether the coupling element is a leaf spring 38 or a lever-like element of some other design is not crucial for the operating principle of the coupling mechanism 44. One or more leaf springs 38, 40 can be utilized as a translation element, even if they do not fulfill the other clutch-relevant functions previously enumerated. Furthermore, the contact pin 42 or some other coupling element can be connected to the contact plate 26 and be supported on the second leaf spring 40, which is connected to the separator plate 34. Additionally, in comparison to the clutch 20 designed by way of example on the basis of a dual-plate clutch as shown in FIG. 2, more than one separator plate 34 can be provided, which can accordingly be coupled with the contact plate 26 by means of one of the coupling mechanisms 44 described above.

In the contact points 56, 64 between the separator plates 34 and the first leaf springs 38, which fix the position of the contact plates 26, what is important basically is not the design but only the contact, so that the first leaf springs 38 can move the separator plate 34 in the axial direction. Nevertheless, there are naturally certain solutions that are especially appropriate technically, such as the variants presented below.

Figure 20:
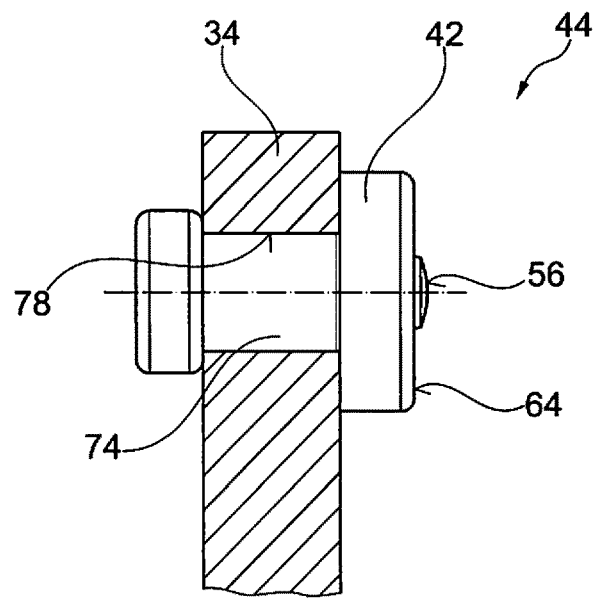
FIG. 20: a fragmentary schematic cross-sectional detail view of a portion of a fourth embodiment of a contact pin of a multi-plate clutch according to the present invention.

FIG. 20 shows the contact pin 42, which has already been designed and referred to repeatedly in the previous figures as a support rivet. The rivet 42 can be connected easily to very different separator plates 34 and separator plate materials. In addition, the rivet 42 can very easily be hardened, coated, or made of an especially hard or lubricious material. That enables the contact point 56 to be made robust and subject to little wear, and can reduce the hysteresis due to friction. The exemplary embodiment shows a rivet with two contact points 56, 64. Both the center elevation and the edge of the rivet head can be utilized as contact points 56, 64. Either one or both contact points 56, 64 can be realized and used. A rivet 42 having two contact points 56, 64 is especially attractive for coupling mechanisms 44 having changeable translation distances, since that eliminates the need of placing two individual rivets 42 side-by-side. In addition, as shown in FIG. 21 a continuous transition contour 66 between the two contact points 56, 64 spaced at a maximum interval can also enable and influence a continuous change of the translation distance.

Instead of rotationally symmetrical rivets as shown in FIGS. 20 and 21, the contact pins 42 can also be designed as shaped non-rotationally symmetrical rivets, which offer the first leaf spring 38 a larger supporting surface and can make linear contact possible. If the rivet 42 is no longer rotationally symmetrical, it should be connected to the separator plate 34 in the correct orientation to achieve the correct separator plate position and the desired distance translation distance.

Figure 22A:
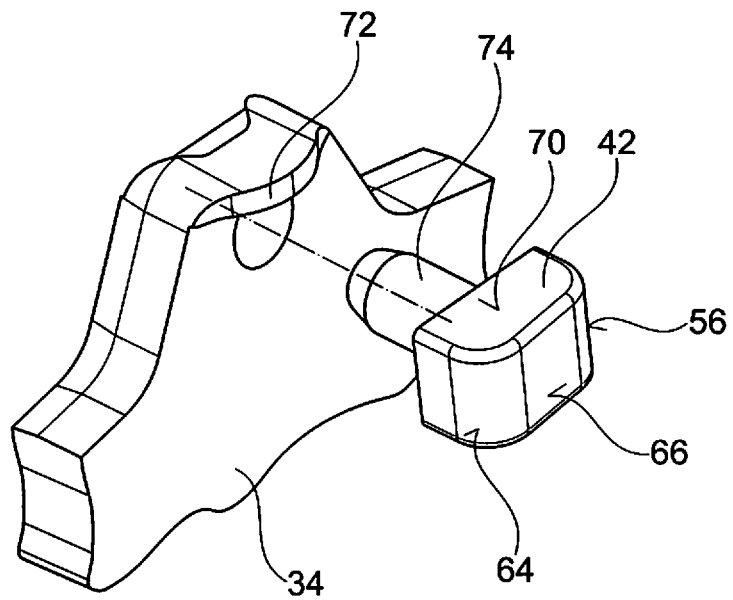
FIG. 22a: a fragmentary schematic perspective detail view of a portion of a sixth embodiment of a contact pin of a multi-plate clutch according to the present invention.
Figure 22B:
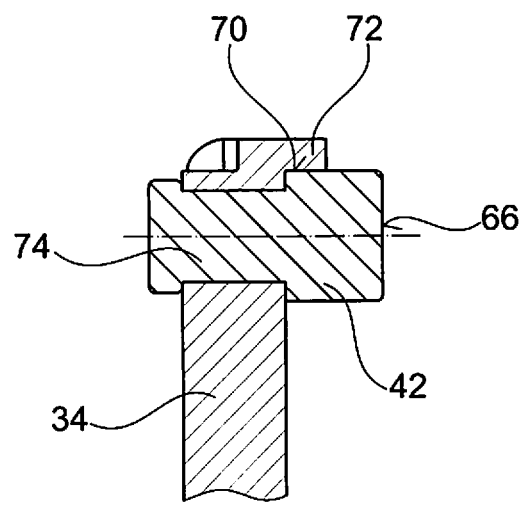
FIG. 22b: a fragmentary schematic cross-sectional detailed view of the contact pin of a multi-plate clutch of FIG. 22a, FIG. 23: a fragmentary schematic perspective detail view of a contact pin portion of a seventh embodiment of a multi-plate clutch according to the present invention.

FIGS. 22a and 22b show by way of example the shaped rivet 42 with the two contact points 56, 64, which is already known from the exemplary embodiment with changeable translation (FIGS. 12 through 15). In the detailed illustrations it can be seen how the shaped rivet 42 can be aligned on an axially protruding bar 72 extending from the outer surface of the separator plate 34 by means of an outer contour 70 at its non-rounded head surface. The axially extending bar 72 of the separator plate 34 simplifies the assembly alignment of the contact pin, and prevents contact pin 42 from unwanted rotation, even during operation of the clutch.

Figure 23:
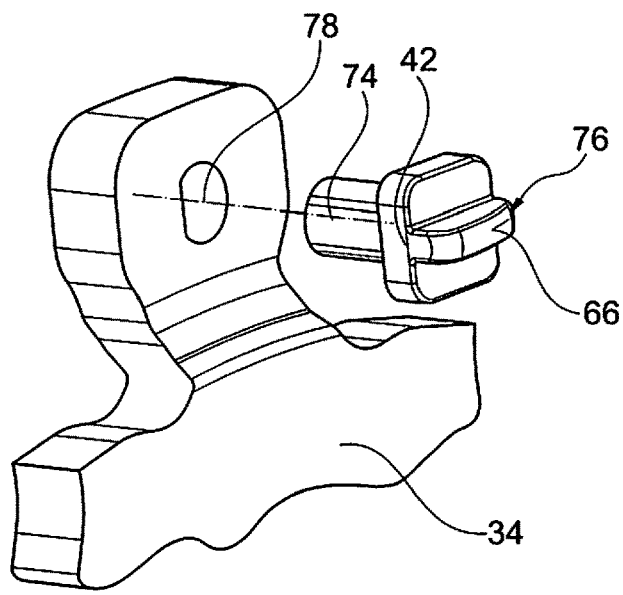
Figure 24:
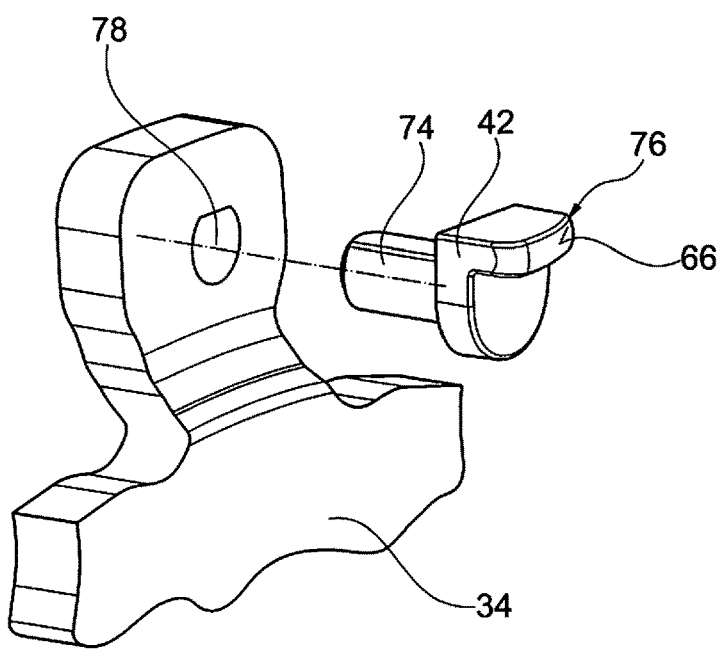
FIG. 24: a fragmentary schematic perspective detail view of contact pin portion of an eighth embodiment of a multi-plate clutch according to the present invention.

Two additional exemplary embodiments, in which the contact pin 42 is aligned relative to the separator plate 34 by a flattened shank 74, are shown in FIGS. 23 and 24. The rivet heads have an axially protruding contact bar 76 that carries the contact contour 66, by which the separator plates 34 can be supported on the first leaf springs 38. The extent of the translation distance can be controlled by the particular contour 66 of the contact bar 76. A continuous, mostly convex curvature of the contact curvature of the contact bar 76 makes it very simple to elicit a continuous translation distance change, which can be adapted in particular to the lining springs 28, 30, the clearance distances, and the lining wear rates. To prevent damage to the contact bar 76 while the contact pin 42 is being set, the rivet shank can be supported next to the contact contour 66 which the first leaf springs 38 utilize. The supporting surfaces for the rivet can be located on both sides of the contact bar 76 (FIG. 23). Alternatively, a single supporting surface for the rivet can also be provided on one side of the contact bar 76 (FIG. 24). It is expedient in that case not to locate the contact bar 76 to directly extend along the axis of the rivet shank 74, so that the supporting surface can largely or completely overlie the rivet shank 74.

FIG. 21 shows a contact pin 42 that is inserted into an opening 78 in the separator plate 34 so that the contact pin is axially movable. On one side of the separator plate 34 the pin shaft 80 is provided with a locking ring 82, which serves as a stop and is supported against the separator plate 34. On the other side is the pin head with the contact contour 66. Between the pin head and the separator plate 34 is a pre-biased diaphragm spring 68, which presses the contact pin 42 against the stop formed by the locking ring 82. Because of the pre-biasing force of the diaphragm spring 68, the contact pin 42 acts like a rigid contact point 56 and fulfills all characteristics described previously for the contact points 56, 64, as long as the contact force does not exceed the pre-biasing force of the diaphragm spring 68. If the latter is the case, the contact pin 42 is shifted axially relative to the separator plate 34. That can limit the maximum axial force exerted on the separator plate 34 by the coupling mechanism 44, and/or change the distance ratios, depending on the axial force.

Leaf springs 38, 40 are mainly used in dry dual clutches 10 because of their low friction. All concepts presented here can also be employed in wet-running clutches, however.

What is claimed is:

1. A dual clutch, for coupling an engine drive shaft to at least one transmission input shaft, said clutch comprising:
    a dual multi-plate clutch including a counter for introducing a torque from the drive shaft to the at least one transmission shaft through a clutch plate, a separator plate, and a contact plate,
    a clutch plate for conveying the torque from a counter plate to the at least one transmission input shaft, the clutch plate including a first lining ring for frictionally engaged torque transfer, and a second lining ring that is movable axially relative to the first lining ring for frictionally engaged torque transfer,
    a separator plate movable axially relative to the counter plate and positioned between the first lining ring and the second lining ring in an axial direction of the clutch, and
    a contact plate movable axially relative to the counter plate by an actuating element to frictionally compress the clutch plate,
    wherein the first lining ring is positioned between the contact plate and the separator plate in the axial direction of the clutch, the second lining ring is axially positioned between the separator plate and the counter plate and including n separator plates and n+1 lining rings,
    wherein axial movement of the separator plate is coupled with the axial movement of the contact plate by a coupling mechanism, and
    wherein over at least part of the axial spacing between an open position of the contact plate corresponding to a disengaged position of the multi-plate clutch, and a maximum closed position of the contact plate corresponding to an engaged position of the multi-plate clutch when friction linings carried by the lining rings are worn, a current translation distance ratio i(sA) of an axial displacement of the contact plate to an axial displacement of the separator plate that is furthest distant in the axial direction from the contact plate at an axial position sA of the contact plate deviates from i(sA)=n+1 and a current distance translation ratio i(sA)j of the axial displacement of the contact plate to the axial displacement of a jth separator plate at an axial position sA of the contact plate deviates from i(sA)j= (n+1)/j, where j is counted starting from the counter plate in the direction of the contact plate, wherein a current translation distance ratio i(sA) between the open position of the contact plate and the maximum closed position of the contact plate, in particular between the open position of the contact plate and a closed position of the contact plate corresponding to the engaged position of the multi-plate clutch with unworn lining rings, changes at least once.

2. A dual clutch according to claim 1, wherein a current value of the translation distance ratio i(sA), at least in a distance segment between the open position of the contact plate and a closed position of the contact plate that corresponds to the engaged position of the multi-plate clutch with unworn lining rings is 0.00<|i(sA)−(n+1)|/(n+1)≤5.0, in particular 0.01≤|i(sA)−(n+1)|/(n+1)≤2.5, preferably 0.05≤|i(sA)−(n+1)|/(n+1)≤1.5, more preferably 0.07≤|i(sA)−(n+1)|/(n+1)≤1.0, and by particular preference 0.10≤|i(sA)−(n+1)|/(n+1)≤0.8.

3. A multi-plate dual clutch according to claim 1, wherein the first lining ring includes a first lining spring and the second lining ring includes a second lining spring, wherein the first lining spring is compressible maximally in the axial direction by a first axial distance sBF1, and the second lining spring is compressible maximally in the axial direction by a second axial distance sBF2 that differs from the first axial distance sBF1, wherein 0.00<2|sBF1−sBF2|/(sBF1, +sBF2) ≤2.0.

4. A dual clutch according to claim 1, wherein the first lining ring includes a first friction lining having an effective axial first friction lining thickness d1, and the second lining ring includes a second friction lining having an effective second axial friction lining thickness d2 that differs from the first friction lining thickness d1, and wherein 0.0<2|d1−d2|/ (d1+d2)<2.0.

5. A dual clutch according to claim 1, wherein when the contact plate moves from the open position to a closed position of the contact plate corresponding to the engaged position of the multi-plate clutch with unworn lining rings, the first lining ring and the second lining ring are frictionally compressed at different points in time compression begins and ends at different points in time.

6. A dual clutch according to claim 1, wherein the contact plate is connected to the counter plate by a first leaf spring, the separator plate is connected to the counter plate by a second leaf spring, and the separator plate is supported on the contact plate by a contact pin that rests against one of the first leaf spring, the second leaf spring, and another element that includes a contact point.

7. A dual clutch according to claim 6, wherein the separator plate is supported by at least two contact points on the first leaf spring that are offset relative to one another in one of the circumferential direction and the radial direction to change the current translation distance ratio i(sA), and wherein the at least two contact points are located on the same contact pin.

8. A dual clutch according to claim 7, wherein the contact pin has a convex contact contour facing the first leaf spring to change the current translation distance ratio i(sA) continuously in at least in a segment of the axial movement path of the contact plate.

9. A dual clutch according to claim 5, wherein the contact pin is connected to the separator plate and is secured against rotation relative to the separator plate.

10. A dual clutch according to claim 5, wherein the contact pin is axially pre-biased by a spring force, and the contact pin includes an end stop that blocks the movement of the contact pin in one axial direction and permits movement of the contact pin in the opposite axial direction.

11. A dual clutch according to claim 5, wherein the contact pin deflects the first leaf spring in an axial direction at the maximum closed position of the contact plate, corresponding to the engaged position of the multi-plate clutch with unworn lining rings.

12. A dual clutch according to claim 5, wherein the contact pin is a rivet carried by the separator plate, and a contact point of the contact pin that contacts the first leaf spring is offset in the radial direction of the dual clutch relative to a rivet shank of the contact pin, while the contact point viewed in the direction of the rivet shank axis is positioned within a projection of a rivet shank cross section and a bearing area for assembly is provided as an axial extension of the rivet shank, the bearing area completely covering the projection of the rivet shank cross section.

13. A dual clutch according to claim 1, wherein a current translation distance ratio i(sA) between the open position of the contact plate and the maximum closed position of the contact plate, in particular between the open position of the contact plate and a closed position of the contact plate corresponding to the engaged position of the multi-plate clutch with unworn lining rings changes continuously.

14. A dual clutch according to claim 1, wherein the first lining ring includes a first lining spring and the second lining ring includes a second lining spring, wherein the first lining spring is compressible maximally in the axial direction by a first axial distance sBF1, and the second lining spring is compressible maximally in the axial direction by a second axial distance SBF2 that differs from the first axial distance sBF1, wherein 0.05≤2|sBF1−sBF2|/(sBF1+sBF2)≤1.7.

15. A dual clutch according to claim 1, wherein the first lining ring includes a first lining spring and the second lining ring includes a second lining spring, wherein the first lining spring is compressible maximally in the axial direction by a first axial distance sBF1, and the second lining spring is compressible maximally in the axial direction by a second axial distance SBF2 that differs from the first axial distance sBF1, wherein 0.10≤2|sBF1−sBF2|/(sBF1+sBF2)≤1.5.

16. A dual clutch according to claim 1, wherein the first lining ring includes a first lining spring and the second lining ring includes a second lining spring, wherein the first lining spring is compressible maximally in the axial direction by a first axial distance sBF1, and the second lining spring is compressible maximally in the axial direction by a second axial distance SBF2 that differs from the first axial distance sBF1, wherein 0.20≤2|sBF1−sBF2|/(sBF1+sBF2)≤1.0.

17. A dual clutch according to claim 1, wherein the first lining ring includes a first friction lining having an effective axial first friction lining thickness d1, and the second lining ring includes a second friction lining having an effective second axial friction lining thickness d2 that differs from the first friction lining thickness d1, and wherein $0.01 \leq 2|d1-d2|/(d1+d2) \leq 1.8$.

18. A dual clutch according to claim 1, wherein the first lining ring includes a first friction lining having an effective axial first friction lining thickness d1, and the second lining ring includes a second friction lining having an effective second axial friction lining thickness d2 that differs from the first friction lining thickness d1, and wherein $0.05 \leq 2|d1-d2|/(d1+d2) \leq 1.5$.

19. A dual clutch according to claim 1, wherein the first lining ring includes a first friction lining having an effective axial first friction lining thickness d1, and the second lining ring includes a second friction lining having an effective second axial friction lining thickness d2 that differs from the first friction lining thickness d1, and wherein $0.10 \leq 2|d1-d2|/(d1+d2) \leq 1.0$.

20. A dual clutch according to claim 1, wherein a current value of the translation distance ratio i(sA), at least in a distance segment between the open position of the contact plate and a closed position of the contact plate that corresponds to the engaged position of the multi-plate clutch with unworn lining rings is $0.01 \leq |i(sA)-(n+1)|/(n+1) \leq 2.5$.

21. A dual clutch according to claim 1, wherein a current value of the translation distance ratio i(sA), at least in a distance segment between the open position of the contact plate and a closed position of the contact plate that corresponds to the engaged position of the multi-plate clutch with unworn lining rings is $0.05 \leq |i(sA)-(n+1)|/(n+1) \leq 1.5$.

22. A dual clutch according to claim 1, wherein a current value of the translation distance ratio i(sA), at least in a distance segment between the open position of the contact plate and a closed position of the contact plate that corresponds to the engaged position of the multi-plate clutch with unworn lining rings is $0.07 \leq |i(sA)-(n+1)|/(n+1) \leq 1.0$.

23. A dual clutch according to claim 1, wherein a current value of the translation distance ratio i(sA), at least in a distance segment between the open position of the contact plate and a closed position of the contact plate that corresponds to the engaged position of the multi-plate clutch with unworn lining rings is $0.10 \leq |i(sA)-(n+1)|/(n+1) \leq 0.8$.

* * * * *